(12) United States Patent
Takahashi et al.

(10) Patent No.: US 8,971,939 B2
(45) Date of Patent: *Mar. 3, 2015

(54) TRANSMITTING APPARATUS, RECEIVING APPARATUS, AND COMMUNICATION SYSTEM FOR FORMATTING DATA

(75) Inventors: Hiroaki Takahashi, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,699

(22) Filed: Jun. 15, 2011

(65) Prior Publication Data

US 2011/0243271 A1 Oct. 6, 2011

Related U.S. Application Data

(63) Continuation of application No. 11/004,256, filed on Dec. 3, 2004, now Pat. No. 7,983,140, which is a continuation of application No. 10/004,750, filed on Dec. 3, 2001, now Pat. No. 6,941,151.

(30) Foreign Application Priority Data

Dec. 8, 2000 (JP) ................................ 2000-374606

(51) Int. Cl.
*H04B 7/00* (2006.01)
*H04B 1/38* (2006.01)
(Continued)

(52) U.S. Cl.
CPC ................ *H04B 7/2656* (2013.01); *H04J 3/00* (2013.01); *H04L 27/2602* (2013.01); *H04L 27/3405* (2013.01)
USPC .......... 455/502; 455/562.1; 455/73; 370/208; 370/336; 370/442

(58) Field of Classification Search
CPC ........................... H04W 52/42; H04L 27/2662
USPC ........................................ 370/208, 344, 450
See application file for complete search history.

(56) References Cited

U.S. PATENT DOCUMENTS 5,369,637 A * 11/1994 Richardson et al. .......... 370/281
5,541,552 A 7/1996 Suzuki et al.
(Continued)

FOREIGN PATENT DOCUMENTS

JP 62-241448 A 10/1987
JP 02-224428 A 9/1990
(Continued)

OTHER PUBLICATIONS

Czylwik, A. "Adaptive OFDM for wideband radio channels," Global Telecommunications Conference, 1996; GLOBECOM '96: Communications: The Key to Global Prosperity, Nov. 18-22, 1996. vol. 1, pp. 713-718.

(Continued)

*Primary Examiner* — Tilahun B Gesesse
(74) *Attorney, Agent, or Firm* — Wolf, Greenfield & Sacks, P.C.

(57) ABSTRACT

A transmitting apparatus, a receiving apparatus, and a communication system are provided that allow a reduction in a frame loss due to interference caused by use of the same channel. A transmitting apparatus disposed in a base station includes a GPS receiver for receiving a GPS signal, a timing generator for controlling respective function blocks in accordance with the GPS signal and an inter-base-station control signal so as to precisely synchronize the timing of frame transmission among base stations, the front-end transmission processing unit including for converting transmission information into transmission time slots, a frame generator for generating a frame including a plurality of time slots and one frame guard, and a back-end transmission processing unit for transmitting the generated frame as a radio signal.

12 Claims, 17 Drawing Sheets

(51) Int. Cl.
*H04M 1/00* (2006.01)
*H04B 7/26* (2006.01)
*H04J 3/00* (2006.01)
*H04L 27/26* (2006.01)
*H04L 27/34* (2006.01)

(56) References Cited

U.S. PATENT DOCUMENTS

| | | | |
|---|---|---|---|
| 5,608,765 A * | 3/1997 | Tanoue | 375/365 |
| 5,677,841 A | 10/1997 | Shiomi et al. | |
| 5,818,813 A * | 10/1998 | Saito et al. | 370/208 |
| 5,933,053 A * | 8/1999 | Iemura | 329/311 |
| 6,192,056 B1 | 2/2001 | Tsuruoka | |
| 6,252,910 B1 | 6/2001 | West et al. | |
| 6,545,997 B1 | 4/2003 | Bohnke et al. | |
| 6,700,875 B1 | 3/2004 | Schroeder et al. | |
| 6,771,976 B1 | 8/2004 | Koyama | |
| 6,856,652 B2 | 2/2005 | West et al. | |
| 6,941,151 B2 * | 9/2005 | Takahashi et al. | 455/502 |
| 6,963,626 B1 * | 11/2005 | Shaeffer et al. | 375/346 |
| 7,027,498 B2 | 4/2006 | McCarty, Jr. | |
| 7,542,729 B2 | 6/2009 | Oshima | |
| 7,567,545 B2 | 7/2009 | Cho et al. | |
| 7,983,140 B2 * | 7/2011 | Takahashi et al. | 370/204 |
| 8,842,645 B2 | 9/2014 | Takahashi et al. | |
| 2001/0031015 A1 | 10/2001 | West et al. | |
| 2002/0037732 A1 | 3/2002 | Gous et al. | |
| 2002/0039906 A1 | 4/2002 | Rudolf et al. | |
| 2002/0086690 A1 | 7/2002 | Takahashi et al. | |
| 2011/0194591 A1 | 8/2011 | Agee et al. | |
| 2013/0051291 A1 | 2/2013 | Alamouti et al. | |
| 2014/0071962 A1 | 3/2014 | Takahashi et al. | |
| 2014/0086357 A1 | 3/2014 | Takahashi et al. | |
| 2014/0119475 A1 | 5/2014 | Takahashi et al. | |

FOREIGN PATENT DOCUMENTS

| | | |
|---|---|---|
| JP | 06-053918 A | 2/1994 |
| JP | 08-023568 A | 1/1996 |
| JP | H08-107431 A | 4/1996 |
| JP | 08-265312 A | 10/1996 |
| JP | 10-190610 A | 7/1998 |
| JP | 10-336142 A | 12/1998 |
| JP | 11-113049 A | 4/1999 |
| JP | 2000-068975 A | 3/2000 |
| JP | 2000-196560 A | 7/2000 |
| JP | 2001-197034 A | 7/2001 |
| JP | 2001-197142 A | 7/2001 |
| JP | 2002-185423 A | 6/2002 |
| JP | 4341176 B2 | 10/2009 |

OTHER PUBLICATIONS

Office Action issued from the Japanese patent office on Oct. 2, 2009, in related Japanese Application No. 2000-374606.

Office Action issued from the Japanese Patent Office on Jan. 6, 2010, in related Japanese Application No. 2000-374606.

Office Action dated Oct. 5, 2004, issued in related U.S. Appl. No. 10/004,750.

Notice of Allowance dated Apr. 19, 2005, issued in related U.S. Appl. No. 10/004,750.

Office Action dated Nov. 28. 2007, issued in related U.S. Appl. No. 11/004,256.

Office Action dated Jul. 30, 2008, issued in related U.S. Appl. No. 11/004,256.

Office Action dated Jan. 30, 2009, issued in related U.S. Appl. No. 11/004,256.

Office Action dated Jul. 10, 2009, issued in related U.S. Appl. No. 11/004,256.

Office Action dated Jan. 6, 2010, issued in related U.S. Appl. No. 11/004,256.

Office Action dated May 27, 2010, issued in related U.S. Appl. No. 11/004,256.

Office Action dated Dec. 7, 2010, issued in related U.S. Appl. No. 11/004,256.

Notice of Allowance dated Mar. 15, 2011, issued in related U.S. Appl. No. 11/004,256.

* cited by examiner

16QAM

QPSK

TRANSMITTING APPARATUS, RECEIVING APPARATUS, AND COMMUNICATION SYSTEM FOR FORMATTING DATA

CROSS-REFERENCE TO RELATED APPLICATIONS

This application is a continuation of Application No. 11/004,256, filed Dec. 3, 2004, now U.S. Pat. No. 7,983,140, which is a continuation of Application No. 10/004,750, filed Dec. 3, 2001, now U.S. Pat. No. 6,941,151, both of which are incorporated herein by reference, and claims the benefit of Japanese Patent Application JP 2000-374606, filed Dec. 8, 2000.

BACKGROUND OF THE INVENTION

1. Field of the Invention

The present invention relates to a transmitting apparatus, a receiving apparatus, and a communication system, for use in a mobile communication system, and more specifically, to an improvement in a format of data that is modulated and transmitted using, for example, an OFDM (Orthogonal Frequency Division Multiplexing) technique.

2. Description of the Related Art

In recent years, mobile communication using a portable telephone or the like has become increasingly popular. Mobile communication is used to transmit not only information with a small data size such as voice data but also information with a large data size.

In a mobile communication system, as shown in FIG. 16, a plurality of base stations BS are distributed in a ground plane so that a mobile station MS can communicate with a base station BS located near the mobile station MS.

Herein, an area within which a base station can communicate with a mobile station is referred to as a cell.

In such a mobile communication system, in order to avoid cross talk, each cell uses a frequency different from those used in adjacent cells.

However, the same frequency channel can be used in a more distant cell outside the adjacent cells without encountering a significant problem, because, for a mobile station MS being in a cell, the strength of a signal received from a base station BS of that cell is greater than that of an interfering signal coming from a distant cell.

If the distance among cells in which the same frequency channel is used is set to be very large, a large number of different frequency channels are necessary, and thus the spectrum efficiency becomes low. That is, there is a trade-off between the interference due to usage of same frequency channel and the spectrum efficiency.

Thus, it is important to design a communication system such that the system has high resistance against interference thereby achieving an improvement in the spectrum efficiency.

OFDM modulation is known as a technique having high resistance against multipath interference and having high spectrum efficiency.

In the OFDM modulation, after performing first modulation (such as QPSK or 16QAM), an inverse Fourier transform is performed on as many transmission signal symbols as 2n at a time thereby creating as many orthogonal subcarriers as 2n along a frequency axis as shown in FIG. 17.

In a mobile communication system using the OFDM modulation technique, each mobile station communicates with a base station closest to the mobile station.

More specifically, in a communication system using the OFDM modulation technique, a plurality of time slots TSLT each including an effective symbol period TSBL and a guard period TGD are combined into a frame FRM, as shown in FIG. 18, and transmitted from a base station BS. In the example shown in FIG. 18, each frame FRM includes three time slots.

Base stations BS are synchronized in terms of transmission so that frames are transmitted with the same timing.

The purpose of a guard period TGD added to each effective symbol period TSBL is to suppress intersymbol interference due to multipath transmission or fading.

Each time slot including a guard period TGD is produced, as disclosed, for example, in Japanese Unexamined Patent Application Publication No. 7-99486, by connecting the same signal as a predetermined length of head or tail end part of a signal in an effective symbol period to an opposite end of that effective symbol period or by connecting the same signals as predetermined length of both head and tail end parts of a signal in an effective symbol period to opposite ends of the effective symbol period. More specifically, the same signal as a signal at a tail end part of an effective period is connected to the head end of the effective symbol period, or the same signal as a signal at a head end part of an effective period is connected to the tail end of the effective symbol period, or otherwise, the same signals as signals at head and tail end parts of an effective period are respectively connected to the tail and head ends of the effective symbol period.

In a receiving system of a mobile station that receives such an OFDM signal, as shown in FIG. 19, the correlation is determined between the received OFDM signal and a signal obtained by delaying the OFDM signal by a time equal to one effective symbol period. The start positions of respective effective symbol periods are then determined from peak positions of detected in the correlation. That is, it is possible to determine the location of a guard period in each time slot.

The detection of the start position of an effective symbol period allows an OFDM demodulator to perform an FFT (Fast Fourier Transform) operation.

An example of such an OFDM demodulator is disclosed in, for example, Japanese Unexamined Patent Application Publication No. 8-107431.

In the OFDM demodulator disclosed in the Japanese Unexamined Patent Application Publication No. 8-107431 cited above, the correlation between a received OFDM signal and a signal obtained by delaying the received OFDM signal by an effective symbol period, and the resultant correlation signal is subjected to an interval integration. In the above process, the interval integration is performed, as shown in FIG. 20, for intervals created by dividing the correlation signal into segments that is, intervals, each having a length equal to the time slot period.

That is, the cumulative sum of the correlation signal is determined by repeatedly adding the correlation signal in the respective intervals. In the resultant signal, peaks appear at particular positions within the time slot period as shown in FIG. 20(E). In parts where there is no correlation, the values are averaged as the interval integration advances.

As described above, the interval integration makes it possible to clearly distinguish a correlated period from an uncorrelated period, and the detection of a peak makes it possible to achieve synchronization in a more reliable fashion.

In the communication system using an OFDM signal added with a guard period, as described above, although intersymbol interference due to multipath transmission or fading can be suppressed, there is still a possibility that a mobile station encounters interference when receiving the OFDM signal added with the guard period in some situations.

A mobile station receives a signal in such a manner as described below.

In addition to a desired wave DSW, a mobile station also receives an interfering wave IFW via the same channel. In most cases, the interfering wave IFW does not cause a problem, because the reception signal strength of the desired wave DSW is much greater than that of the interfering wave IFW.

However, fading occurs as a mobile station moves, and thus the reception signal strength of the desired wave DSW and that of the interfering wave IFW frequently vary.

In general, there is no correlation between fading of a desired wave DSW and that of an interfering wave IFW. That is, the desired wave DSW and the interfering wave IFW fluctuate independently of each other. This means that the reception signal strength of the interfering wave IFW can become high when that of the desired wave DSW becomes low. In such a case, there is a possibility that interference makes it impossible to receive the desired wave DSW.

In general, an interfering wave IFW arrives at a mobile station slightly later than a desired wave DSW, because the interfering wave IFW is transmitted from a base station at a more distant location while the desired wave DSW is transmitted from a base station at a closer location.

Referring to an example shown in FIG. 18, a possible reception of an interfering wave IFW is discussed below for a case in which a fluctuation in the reception signal strength due to fading causes a signal transmitted from a distant base station using the same channel to be received as an interfering wave IFW. It is assumed herein that only one frame is received as the interfering wave IFW as shown in FIG. 18(B).

In contrast, in the case of a desired wave DSW, frames are successively received as shown in FIG. 18(A).

Because the interfering wave IFW arrives slightly later than the desired wave DSW as shown in FIG. 18(B), the interfering wave IFW interferes with two frames, denoted by (i) and (ii) in FIG. 18, of the desired wave DSW.

In view of the above, an object of the present invention is to provide a transmitting apparatus, a receiving apparatus, and a communication system, which allow suppression of a frame loss due to interference caused by use of the same channel even in a system in which the number of repetition cells is set to be small, that is, the distance between cells where the same channel is used is set to be small to achieve high-efficiency use of radio channels.

SUMMARY OF THE INVENTION

According to an aspect of the present invention, to achieve the above object, there is provided a transmitting apparatus comprising a front-end transmission processing unit for converting transmission signal into a transmission time slot; a frame generator for generating a frame including a series of n (integer equal to or greater than 1) time slots and a frame guard period added to the series of n time slots to suppress a frame loss due to interference; and a back-end transmission processing unit for transmitting the generated frame as a radio signal.

According to another aspect of the present invention, there is provided a transmitting apparatus disposed in at least one of a plurality of base stations each of which has a capability of communicating, using a signal according to a predetermined modulation scheme, with a communication terminal being within an area assigned to the base station, the transmitting apparatus comprising a front-end transmission processing unit for converting transmission signal into a transmission time slot; a frame generator for generating a frame including a series of n (integer equal to or greater than 1) time slots and a frame guard period added to the series of n time slots to suppress a frame loss due to interference; and a back-end transmission processing unit for transmitting the generated frame as a radio signal.

The transmitting apparatus according to the present invention preferably further comprises a timing generator for generating a timing signal on the basis of a GPS signal and an inter-base-station control signal for achieving synchronization among base stations, thereby precisely synchronizing the timing of frame transmission among the base stations.

In the transmitting apparatus according to the present invention, the front-end transmission processing unit includes a modulator for modulating transmission information by means of a proper modulation scheme selected on the basis of electric field strength information received from a communication terminal to which the transmission information is transmitted.

In the transmitting apparatus according to the present invention, the frame guard period may be a non-signal period.

In the transmitting apparatus according to the present invention, preferably, the front-end transmission processing unit generates a time slot by adding a predetermined guard period to an effective symbol period.

According to another aspect of the present invention, there is provided a receiving apparatus for receiving a radio signal, each frame of which includes a series of n (integer equal to or greater than 1) time slots and a frame guard period added to the series of n time slots to suppress a frame loss due to interference, each time slot including an effective symbol period and a guard period added to the effective symbol period, the receiving apparatus comprising: a front-end reception processing unit for receiving the radio signal; a synchronization position detector for detecting a starting position of an effective symbol period in the received signal; a timing generator for controlling an operation timing of a functional block, on the basis of synchronization position information supplied from the synchronization position detector; a reception windowing unit for extracting only an effective symbol period including no time guard period and no frame guard, under the control of the timing generator; and a back-end reception processing unit for reproducing desired information from a windowed signal supplied by the reception windowing unit.

According to still another aspect of the present invention, there is provided a receiving apparatus disposed in a communication terminal for receiving a radio signal transmitted from a base station each of which has a capability of communicating, using a signal according to a predetermined modulation scheme, with a communication terminal being within an area assigned to the base station, each frame of the radio signal including a series of n (integer equal to or greater than 1) time slots and a frame guard period added to the series of n time slots to suppress a frame loss due to interference, each time slot including an effective symbol period and a guard period added to the effective symbol period, the receiving apparatus comprising: a front-end reception processing unit for receiving the radio signal; a synchronization position detector for detecting a starting position of an effective symbol period in the received signal; a timing generator for controlling an operation timing of a functional block, on the basis of synchronization position information supplied from the synchronization position detector; a reception windowing unit for extracting only an effective symbol period including no time guard period and no frame guard, under the control of the timing generator; and a back-end reception processing unit for reproducing desired information from a windowed signal supplied by the reception windowing unit.

According to still another aspect of the present invention, there is provided a communication system comprising a transmitting apparatus and a receiving apparatus, wherein the transmitting apparatus comprises a front-end transmission processing unit for converting transmission signal into a transmission time slot; a frame generator for generating a frame including a series of n (integer equal to or greater than 1) time slots and a frame guard period added to the series of n time slots to suppress a frame loss due to interference, each time slot including an effective symbol period and a guard period added to the effective symbol period; and a back-end transmission processing unit for transmitting the generated frame as a radio signal, and wherein the receiving apparatus comprises a front-end reception processing unit for receiving a radio signal transmitted from the transmitting apparatus; a synchronization position detector for detecting a starting position of an effective symbol period in the received signal; a timing generator for controlling an operation timing of a functional block, on the basis of synchronization position information supplied from the synchronization position detector; a reception windowing unit for extracting only an effective symbol period including no time guard period and no frame guard, under the control of the timing generator; and a back-end reception processing unit for reproducing desired information from a windowed signal supplied by the reception windowing unit.

According to still another aspect of the present invention, there is provided a communication system comprising a plurality of communication terminals; and a plurality of base stations, each of which has a capability of communicating, using a signal according to a predetermined modulation scheme, with a communication terminal being within an area assigned to the base station, wherein at least one of the plurality of base stations includes a transmitting apparatus comprising a front-end transmission processing unit for converting transmission signal into a transmission time slot; a frame generator for generating a frame including a series of n (integer equal to or greater than 1) time slots and a frame guard period added to the series of n time slots to suppress a frame loss due to interference, each time slot including an effective symbol period and a guard period added to the effective symbol period; and a back-end transmission processing unit for transmitting the generated frame as a radio signal, and wherein each communication terminal includes a receiving apparatus comprising a front-end reception processing unit for receiving a radio signal transmitted from the transmitting apparatus; a synchronization position detector for detecting a starting position of an effective symbol period in the received signal; a timing generator for controlling an operation timing of a functional block, on the basis of synchronization position information supplied from the synchronization position detector; a reception windowing unit for extracting only an effective symbol period including no time guard period and no frame guard, under the control of the timing generator; and a back-end reception processing unit for reproducing desired information from a windowed signal supplied by the reception windowing unit.

In the communication system according to the present invention, the transmitting apparatus preferably further comprises a timing generator for generating a timing signal on the basis of a GPS signal and an inter-base-station control signal for achieving synchronization among base stations, thereby precisely synchronizing the timing of frame transmission among the base stations.

In the communication system according to the present invention, the front-end transmission processing unit of the transmitting apparatus includes a modulator for modulating transmission information by means of a proper modulation scheme selected on the basis of electric field strength information received from a communication terminal to which the transmission information is transmitted.

In the present invention, for example, the timing generator of a transmitting apparatus disposed in a base station generates a timing signal from the GPS signal and the inter-base-station control signal so that frames can be transmitted from any base station with the precisely synchronized timing in accordance with the timing signal.

In the transmitting apparatus, the front-end transmission processing unit produces a transmission time slot from transmission information and supplies the resultant transmission time slot to the frame generator.

The frame generator generates a frame including a plurality of time slots and a non-signal period serving as a frame guard period, and the frame generator supplies the resultant frame to the back-end transmission processing unit.

The back-end transmission processing unit transmits the supplied frame as a radio signal.

From each base station, as described above, a frame guard period is produced in each transmission frame and the frame is transmitted with the precisely synchronized timing.

If the front-end reception processing unit of the receiving apparatus disposed in a mobile station receives the radio signal transmitted from the transmitting apparatus, the received radio signal is supplied to the synchronization position detector.

The synchronization position detector detects the start position of an effective symbol period from the received signal and outputs synchronization position information indicating the start position of the effective symbol period to the timing generator. The timing generator controls the operation timings of respective functional blocks on the basis of the synchronization position information.

Under the control of the timing generator, the reception windowing unit extracts an effective symbol period including no time guard period and no frame guard period.

Thereafter, in the back-end reception processing unit, desired information is reproduced from the windowed signal.

Thus, the received frame signal including the frame guard period is demodulated and transmission information is reproduced.

DESCRIPTION OF THE PREFERRED EMBODIMENTS

Figure 1:
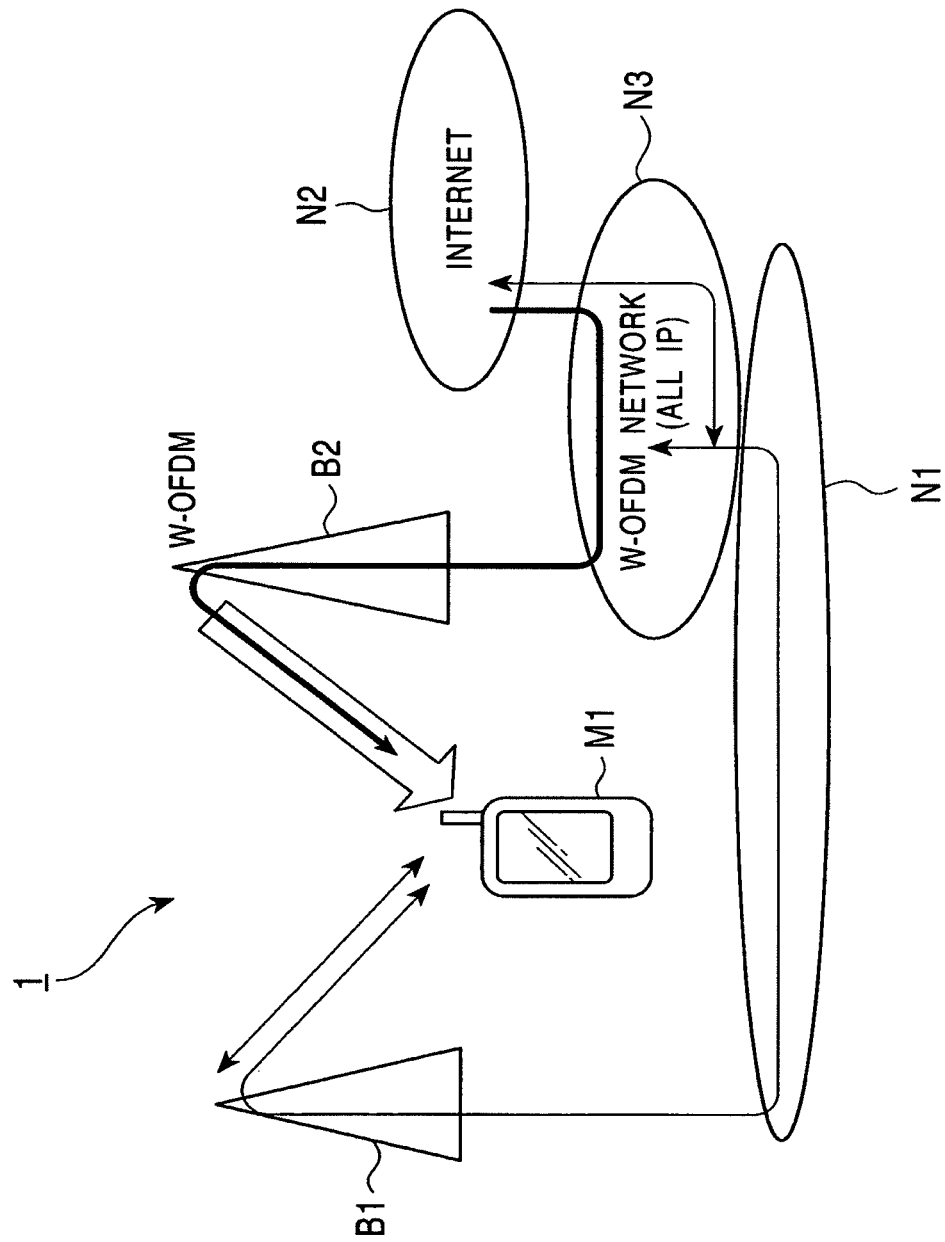
FIG. 1 is a diagram illustrating a general construction of an OFDM communication system including a transmitting apparatus and a receiving apparatus according to the present invention.
Figure 2:
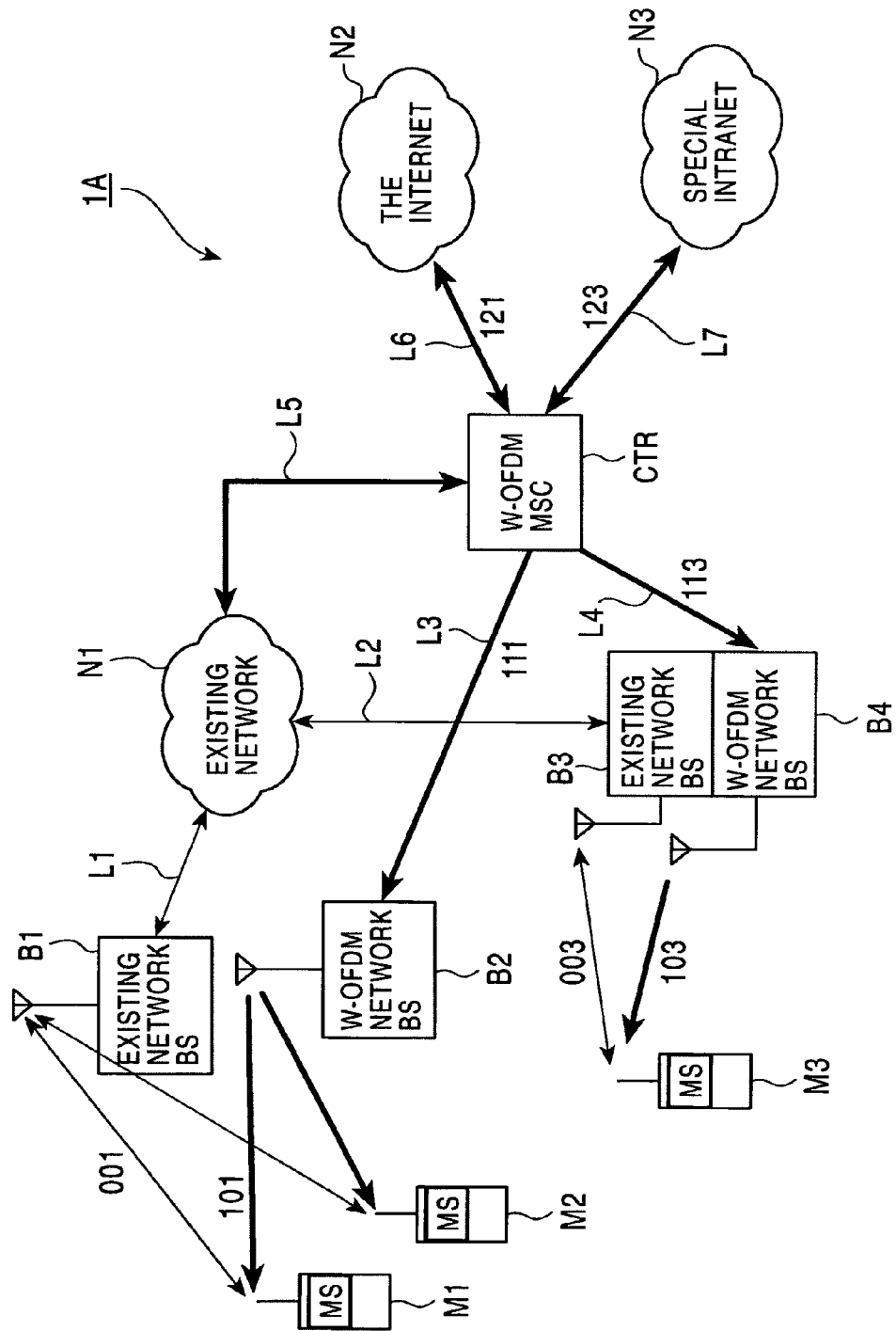
FIG. 2 is a diagram illustrating a specific example of an OFDM communication system including a transmitting apparatus and a receiving apparatus according to the present invention.

FIG. 1 illustrates a general construction of an OFDM communication system including a transmitting apparatus and a receiving apparatus according to the present invention. FIG. 2 illustrates a specific example of an OFDM communication system including a transmitting apparatus and a receiving apparatus according to the present invention.

In this OFDM communication system 1, as shown in FIG. 1, a high-speed downlink system is employed.

As shown in FIG. 1, the OFDM communication system 1 includes a mobile station M1, a conventional base station B1, a high-speed downlink base station B2, an existing cellular network (existing cellular cable network) N1, a data communication network such as the Internet N2, and a high-speed downlink data communication network N3.

In FIGS. 1 and 2, the high-speed downlink system is denoted by "W-OFDM."

In this OFDM communication system 1, as shown in FIG. 1, a control signal, such as an ARQ (Automatic Repeat Request) that is transmitted to request for retransmission of a packet when a data error occurs, is transmitted via the conventional base station B1 and the network (cellular network) N1.

The high-speed downlink system has a very large transmission capacity compared with a conventional portable telephone system so that a mobile station M1 can download a digital content with a large data size, such as image data or moving image data, in a short time via the high-speed downlink system. Any information is transmitted in accordance with the IP.

The data communication network N3 for the high-speed downlink system is connected to the data communication network N2 such as the Internet. The data communication network N3 for the high-speed downlink system is also connected to network N1 so that various control signals generated by the portable telephone base station B1 are transmitted to the data communication network N3 via the network N1.

The OFDM communication system 1A shown in FIG. 2 mainly includes mobile stations (MS) M1 to M3, base satiations (BS) B1 to B4, an existing cellular cable network N1, a data communication network N2 such as the Internet, a data communication network N3 having a downlink database, and a control center (or mobile routing center) CTR for controlling the additional downlink network.

The base station B1 functions as an existing cellular base station. The base station B2 has a capability of an additional downlink. The base station B3 functions as an existing cellular base station. The base station B4 has a capability of an additional downlink.

The cable network N1 is connected to the base stations B1 and B3, for example, via cable communication lines L1 and L2.

The control center CTR is connected to the base stations B2 and B4 via communication lines L3 and L4.

The control center CTR is also connected to the network N1 via a communication line L5, to the data communication network N2 via a communication line L6, and to the data communication network N3 via a communication line L7.

The OFDM communication system 1 or 1A is constructed so as to satisfy the following requirements.

That is, in recent years, mobile communication using a portable telephone or the like has become increasingly popular, and mobile communication is used to transmit not only information with a small data size such as voice data but also information with a large data size such as a digital content.

In transmission of such digital data, it is required to transmit information with a much greater data size than information transmitted from an individual.

To handle such a large data size, an additional downstream line (i.e., a downlink for use of transmission in a direction from a base station to a mobile station) is provided in such a manner that the downlink line is overlaid on the existing cellular network.

This downlink is designed to be capable of transmitting a greater amount of information than the existing cellular network.

In this portable telephone communication system, a low bit rate signal such as a control signal from a mobile station of a user is transmitted using the existing cellular network, and a high bit rate signal such as digital data to be downloaded is transmitted at a high transmission rate via the additional downlink.

In the OFDM communication system 1 or 1A, cells are constructed, for example, as shown in FIG. 3.

In FIGS. 3(A) to 3(F), each solid line indicates an area (cell) within which a conventional portable telephone base station can communicate with a mobile station, and each dotted line indicates an area (cell) within which a wideband radio (W-OFDM) communication system, which is additionally provided for exclusive use of downlink communication, can communicate with a mobile station.

Figure 3A:
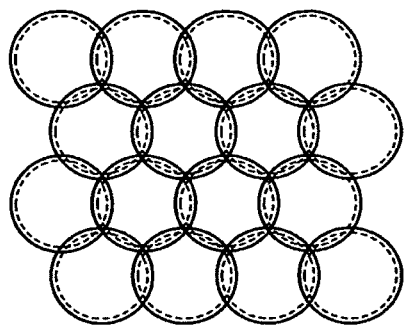
FIGS. 3A to 3F are diagrams illustrating manners of forming cells in the communication system shown in FIG. 1.
Figure 3B:
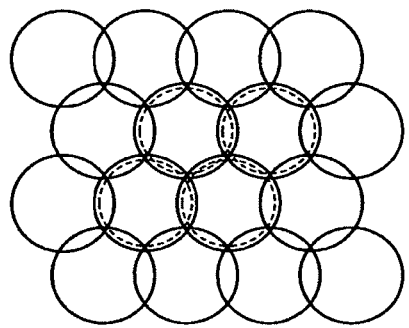
Figure 3C:
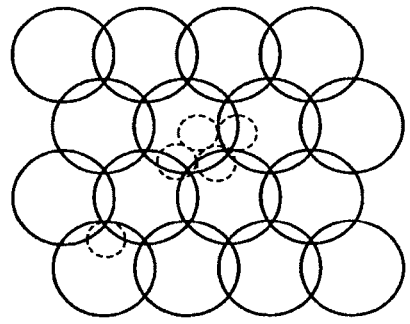
Figure 3D:
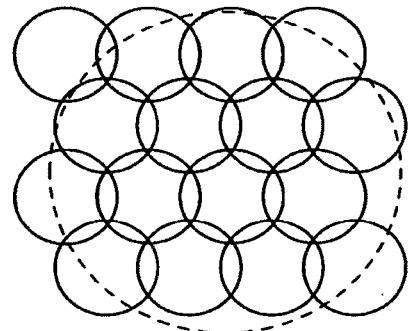
Figure 3E:
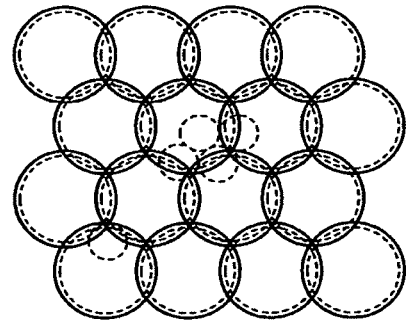
Figure 3F:
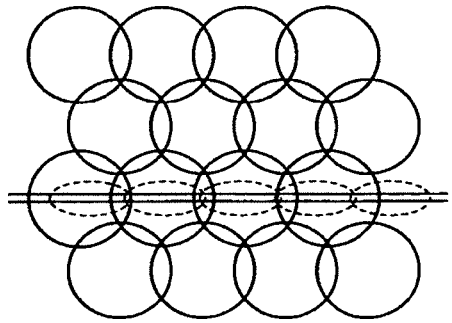

More specifically, W-OFDM base stations may be disposed in the following manners. A first manner is, as shown in FIG. 3A, to dispose W-OFDM base stations in all cells where existing portable telephone base stations are disposed so that the cell structure of W-OFDM base stations become similar to the existing cell structure. A second manner is, as shown in FIG. 3B, to dispose W-OFDM base stations only in areas where there are many users. A third manner is, as shown in FIG. 3C, to dispose, in areas where there are many users, W-OFDM base stations whose output power is smaller than existing base stations, so that the cell sizes covered by W-OFDM base stations become smaller (that is, micro cells are formed) than the existing cell sizes. A forth manner is, as shown in FIG. 3D, to dispose W-OFDM base stations whose output power is greater than existing base stations so that greater-sized cells are formed. A fifth manner is, as shown in FIG. 3E, a mixture of manners shown in FIGS. 3B and 3C (overlay system). A sixth manner is, as shown in FIG. 3F, to form micro cells along main roads.

In the present embodiment, for example, the manner shown in FIG. 3A is employed. That is, W-OFDM base stations are disposed in a similar manner as existing base stations so as to form cells similar to existing cells.

In the W-OFDM communication system 1A using the high-speed downlink system, base stations B1 to B4 receive a GPS (Global Positioning System) signal thereby achieving precise synchronization among those base stations B1 to B4.

An OFDM signal is transmitted in units of frames from a base station in the W-OFDM communication system 1A, as will be described in detail later, such that the timing of transmitting a frame is precisely synchronized among all base stations.

In the W-OFDM communication system 1A, a frequency band is assigned that is different from a frequency band assigned to the existing portable telephone system.

Figure 4:
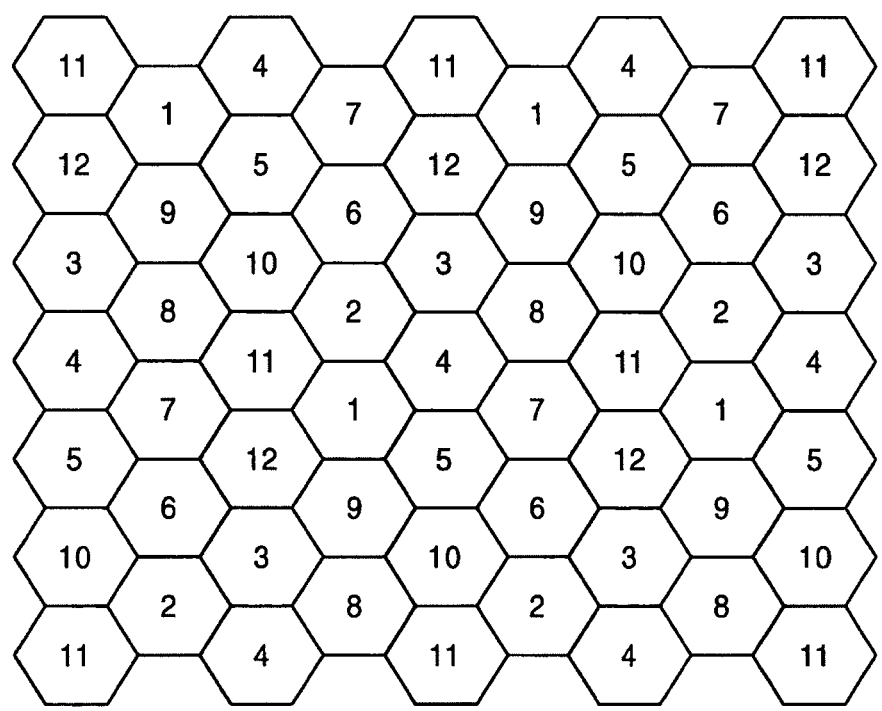
FIG. 4 is a diagram illustrating an example of a manner of assigning radio channels according to an embodiment of the present invention.

The frequency band assigned to the W-OFDM communication system 1A is divided into a plurality of radio channels, and divided radio channels are assigned to respective base stations, for example, as shown in FIG. 4 such that radio channels are used in an efficient manner while minimizing interference caused by use of the same channel.

In the example shown in FIG. 4, the frequency band is divided into 12 radio channels and assigned to base stations (cells). In FIG. 4, numerals from 1 to 12 enclosed in regular hexagons denote radio channel numbers.

An example of a communication process performed in the OFDM communication system 1A shown in FIG. 2 is described below.

If a download request is issued from a mobile station, the download request is transmitted, via the existing cellular network N1 including portable telephone base stations B1 and B3, to the control center CTR in the network of the high-speed downlink system. Upon receiving the download request, the control center CTR transfer the download request to the data communication network N2 such as the Internet. In response to the download request, a digital data content is transmitted from the data communication network N2 to the control center CTR, which in turn transfers the digital data content to the mobile station via the network of the high-speed downlink system and further via the base stations B2 and B4.

In the case where a data error occurs, an ARQ (Automatic Repeat Request) is issued from the mobile station and transmitted to the control center CTR in the network of the high-speed downlink system via the existing cellular network including existing cellular base stations. In response to the ARQ, the control center CTR re-transmits the requested digital data content to the mobile station via the network and base stations of the high-speed downlink system.

More specifically, for example, if the mobile station M1 issues a data download request to the control center CTR, a signal (001) is outputted in a format adapted to the existing system from the mobile station M1 and transmitted to the base station B1.

This request signal is then transmitted to the control center CTR via the existing cellular network N1.

In response to receiving the data download request, the control center CTR acquires the requested data (121) from the data communication network N2 via the communication line L6 and transmits the acquired data (121) as data (111), whose final destination is the mobile station M1, to the base station B2 via the communication line L3.

If the base station B2 receives this data (111), the base station B2 transmits it as data (101) in a format adapted to the additional downlink to the mobile station M1.

Thus, the mobile station M1 finally receives the requested data (101).

In the case where, for example, a data download request to be transmitted to the control center CTR is issued by the mobile station M3, a signal (003) is outputted in the format adapted to the existing system from the mobile station M3 and transmitted to the base station B2.

This request signal is then transmitted to the control center CTR via the existing cellular network N1.

In response to receiving the data download request, the control center CTR acquires the requested data (123) from the data communication network N3 provided for exclusive use by the additional downlink via the communication line L7. To deliver the acquired data (123) to the mobile station M3, the control center CTR transmits the acquired data (123) as data (113) to the base station B4 provided for exclusive use by the additional downlink via the communication line L4.

If the base station B3 receives the data (113), the base station B3 transmits it as data (103) in the format adapted to the additional downlink to the mobile station M3.

Thus, the mobile station M3 finally receives the requested data (103). In the above-described OFDM communication system 1A, an OFDM signal transmitted from a transmitting apparatus disposed in a base station to one of mobile stations M1 to M3 is generated such that each frame FRM includes seven time slot periods TSLT and one frame guard period TFGD, as shown in FIG. 5.

Figure 5:
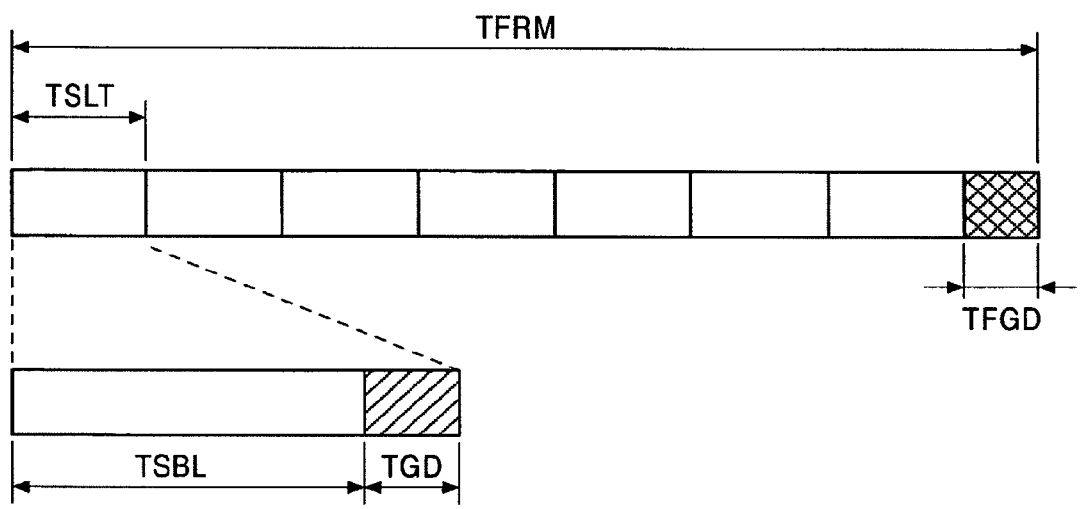
FIG. 5 is a diagram illustrating an example of a format of an OFDM signal including a frame guard according to the present invention.

In FIG. 5, TFRM, TSLT, and TFGD denote a frame period, a time slot period, and a frame guard period, respectively.

The frame guard period includes no signal, and, in the present embodiment, is added to a frame FRM, at the end of a series of seven time slots.

The respective base stations B1 to B3 transmits signals in units of frames each including seven time slots SLT and one frame guard FGD such that the transmission timings become coincident with each other.

In the present embodiment, a frame guard period TFGD is placed at the end of a frame. Alternatively, a frame guard period TFGD may be placed at the beginning of a frame, or frame guard periods TFGD may be placed at both the beginning and the end of a frame.

Each time slot SLT included in a frame FRM is produced by adding a guard GD to an effective symbol period TSBL.

Figure 6:
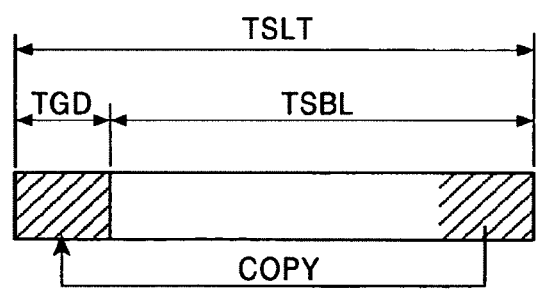
FIG. 6 is a diagram illustrating a method of forming a time slot of an OFDM signal so as to include a guard, in accordance with the present invention.
Figure 7:
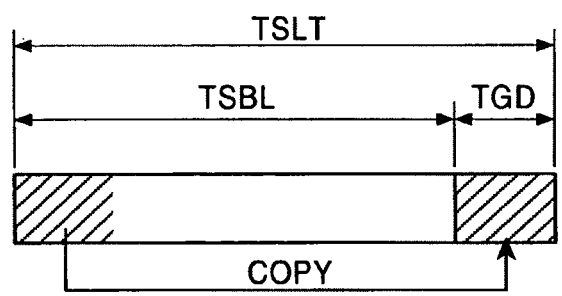
FIG. 7 is a diagram illustrating a method of forming a time slot of an OFDM signal so as to include a guard, in accordance with the present invention.
Figure 8:
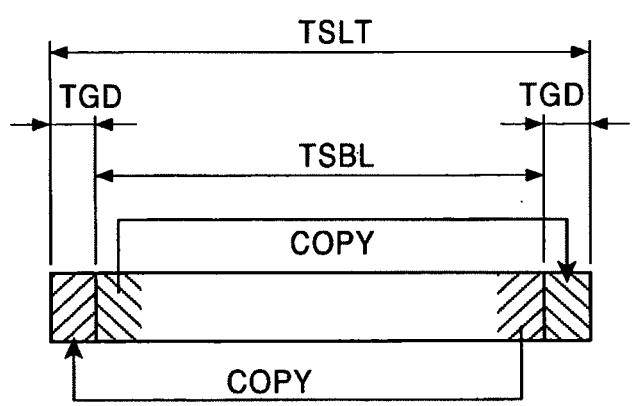
FIG. 8 is a diagram illustrating a method of forming a time slot of an OFDM signal so as to include a guard, in accordance with the present invention.

More specifically, each time slot SLT including an additional guard GD may be produced, as shown in FIGS. 6 to 8, by connecting the same signal as a predetermined length of head or tail end part of a signal in an effective symbol period to an opposite end of that effective symbol period or by connecting the same signals as predetermined length of both head and tail end parts of a signal in an effective symbol period to opposite ends of the effective symbol period. More specifically, in the example shown in FIG. 6, the same signal as a signal at a tail end part of an effective period TSBL is connected to the head end of the effective symbol period. In the example shown in FIG. 7, the same signal as a signal at a head end part of an effective period TSBL is connected to the tail end of the effective symbol period, or otherwise. In the example shown in FIG. 8, the same signals as signals at head and tail end parts of an effective period are respectively connected to the tail and head ends of the effective symbol period.

In the example shown in FIG. 5, the time slot is produced by the method shown in FIG. 7.

As described above, the transmitting apparatus, for transmitting an OFDM signal including a frame constructed by adding a guard period TFGD to a series of time slots each including an effective symbol period TSBL and a guard period TGD added to the effective symbol period TSBL, is disposed in a base station, and the receiving apparatus capable of receiving, with exactly synchronized timing, the OFDM signal including the additional frame guard period transmitted from the transmitting apparatus is provided in each of mobile stations M1 to M3.

Specific constructions and functions of a transmitting apparatus disposed in a base station and a receiving apparatus disposed in a mobile station are described below with reference to the drawings.

Figure 9:
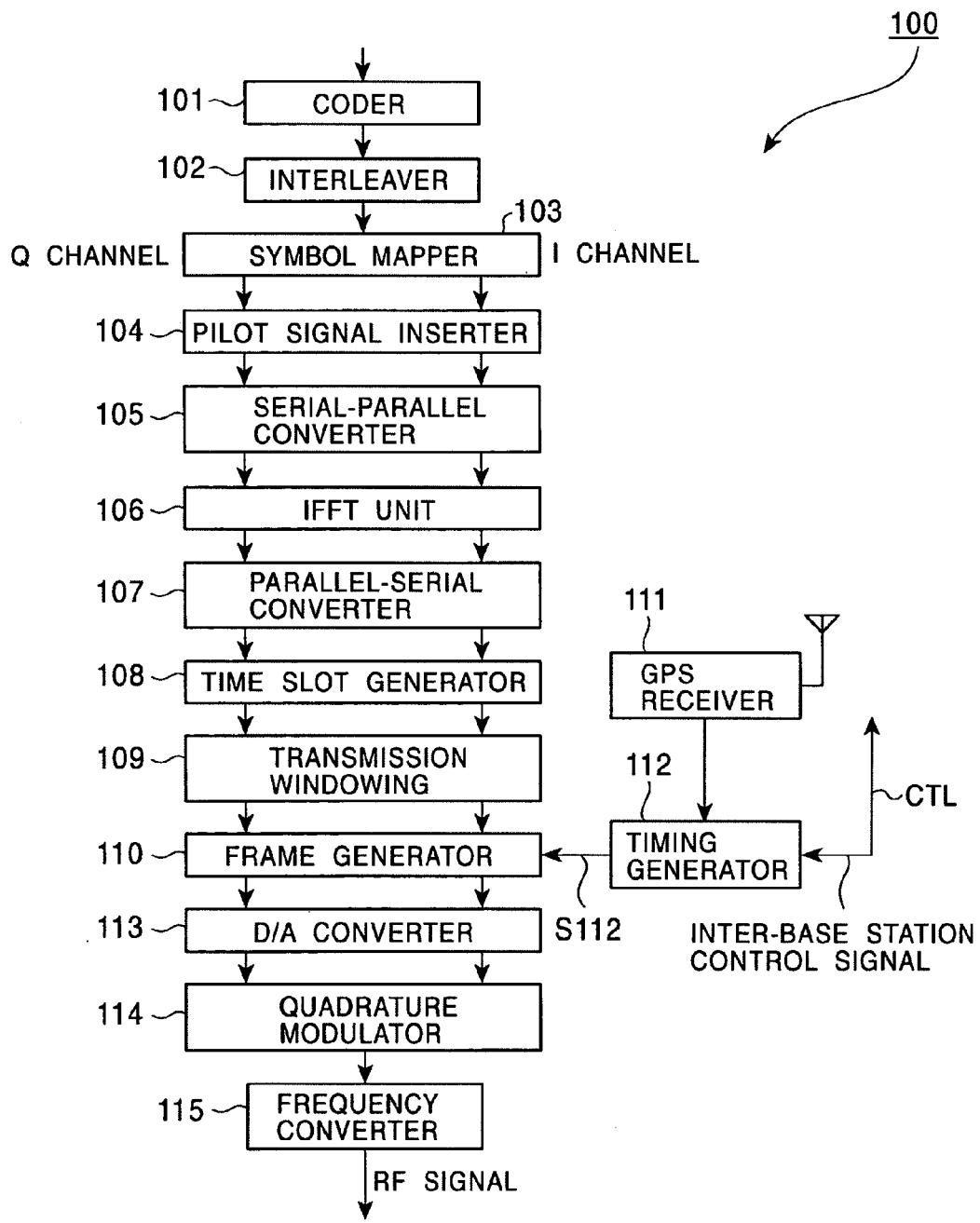
FIG. 9 is a block diagram illustrating a transmitting apparatus disposed in a base station, according to an embodiment of the present invention.

FIG. 9 is a block diagram illustrating a transmitting apparatus disposed in a base station, according to an embodiment of the present invention.

As shown in FIG. 9, the transmitting apparatus 100 according to the present embodiment includes a coder 101, an interleaver 102, a symbol mapper 103, a pilot signal inserter 104, a serial-parallel converter 105, an IFFT unit 106, a parallel-serial converter 107, a time slot generator 108, a transmission windowing unit 109, a frame generator 110, a GPS receiver 111, a timing generator 112, a digital-analog (D/A) converter 113, a quadrature modulator 114, and a frequency converter 115.

In this transmission apparatus 100, a front-end transmission processing unit is formed of the coder 101, the interleaver 102, the symbol mapper 103, the pilot signal inserter 104, the serial-parallel converter 105, the IFFT unit 106, the parallel-serial converter 107, the time slot generator 108, and the transmission windowing unit 109, and a back-end transmission processing unit is formed of the digital-analog (D/A) converter 113, the quadrature modulator 114, and the frequency converter 115.

The coder 101 performs convolution coding with a constraint length of, for example, K=9 on digital data received via the network of the high-speed downlink system. The resultant coded data is outputted to the interleaver 102. The mobile stations M1 to M3 monitor the strength of the electric field of a signal received from a base station of the high-speed downlink system. In accordance with the monitored electric field strength, the coder 101 adjusts the coding rate within the range, for example, from R=2176/2488=0.8764 to R=44/1370=0.397.

The interleaver 102 interleaves the coded digital data supplied from the coder 101 and outputs the resultant interleaved data to the symbol mapper 103.

The symbol mapper 103 determines the symbol mapping scheme (scheme of the first modulation) in accordance with the strength of the electric field, monitored by the mobile station, of the signal transmitted from the base station of the high-speed downlink system, and the symbol mapper 103 performs symbol mapping by the determined symbol mapping scheme. The resultant symbol-mapped data including an I-channel signal and a Q-channel signal is outputted to the pilot signal inserter 104.

Figure 10:
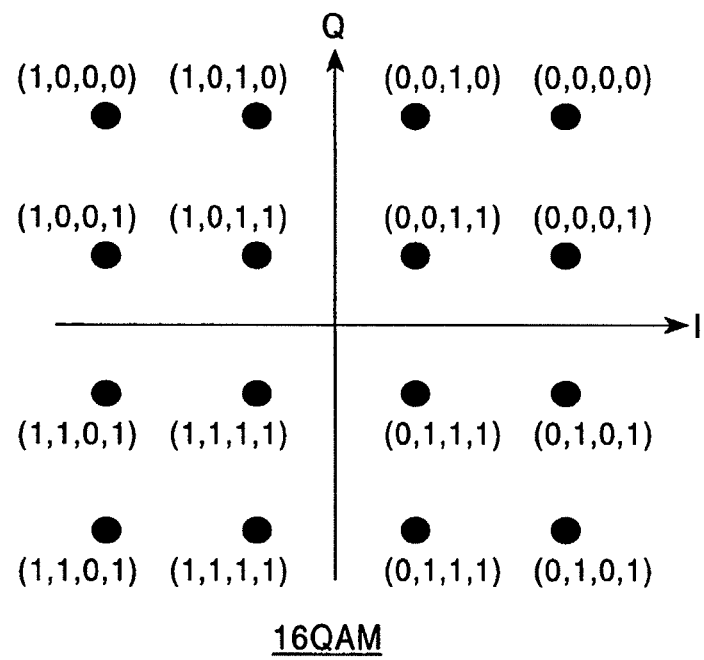
FIG. 10 is a diagram illustrating symbol mapping according to 16QAM.
Figure 11:
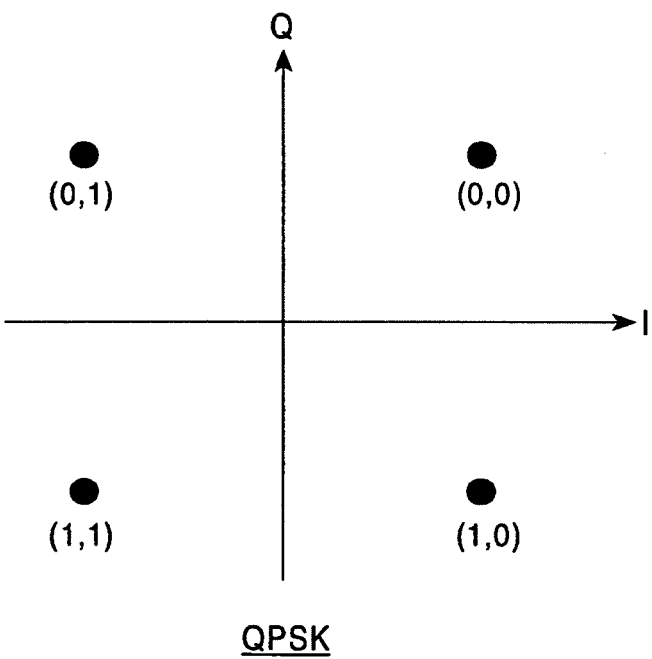
FIG. 11 is a diagram illustrating symbol mapping according to QPSK.

For example, when the electric field strength of the signal transmitted from the base station of the high-speed downlink system has a stable high value, the symbol mapper 103 employs, as the modulation scheme, the 16QAM symbol mapping scheme. In the 16QAM symbol mapping scheme, symbol mapping is performed as shown in FIG. 10. On the other hand, when the electric field strength is weak or unstable, the QPSK (Quadrature Phase Shift Keying) or DQPSK (Differential QPSK) scheme is employed as the modulation scheme. In this case, symbol mapping is performed as shown in FIG. 11.

The pilot signal inserter 104 inserts a pilot signal of "1" into the I-channel signal supplied from the symbol mapper 103 and a pilot signal of "0" into the Q-channel signal and outputs the resultant signals to the serial-parallel converter 105.

The pilot signals inserted by the pilot signal inserter 104 are used by a receiving apparatus of a mobile station to estimate a transmission path and to make a phase compensation. The pilot signals are also used to calculate a threshold value used as a reference value of an amplitude in the first modulation process based on a modulation scheme such as 16QAM in which information is represented by the amplitude.

The serial-parallel converter 105 converts the symbol data including the inserted pilot signals from serial form into parallel form and outputs the resultant data to the IFFT unit 106.

More specifically, the serial-parallel converter 105 divides the input symbol data into segments every 98 symbols, and adds one symbol to head and tail ends of each segment so that each segment includes 100 symbols. Furthermore, the serial-parallel converter 105 puts 1948 symbols of "0" before and after each segment including 100 symbols so that each segment includes a total of 2048 symbols and so that the resultant symbol data has a frequency spectrum in a radio channel band assigned to a base station. The resultant parallel symbol data is outputted to the IFFT unit 106.

The IFFT unit 106 performs an IFFT operation for 2048 points. More specifically, the IFFT unit 106 performs an inverse fast Fourier transform on the parallel 2048 symbol data outputted from the serial-parallel converter 105 thereby making a conversion between time and frequency domains. The resultant data is outputted to the parallel-serial converter 107.

In the OFDM signal used in the present embodiment, the subcarrier interval is, for example, 4 KHz and the effective symbol period is equal to the reciprocal of the subcarrier repetition frequency, that is, equal to 250 (s. The OFDM signal can include a variable number of subcarriers in units of 100 subcarriers (with a frequency bandwidth of 400 kHz) up to 1600 subcarriers (with a frequency bandwidth of 400 kHz (16=6.4 MHz) The IFFT unit performs the IFFT operation for 2048 points.

Herein, we assume that a base station is assigned a radio channel with a bandwidth of 400 kHz.

In this case, as described above, the symbol data inputted to the serial-parallel converter 105 is divided into segments every 98 symbols, and one symbol is added to the head end and also to the tail end of each segment so that each segment includes 100 symbols. Furthermore, 1948 symbols of "0" are put before and after each segment including 100 symbols so that each segment includes a total of 2048 symbols and so that the resultant symbol data has a frequency spectrum in a radio channel band assigned to the base station. The resultant parallel symbol data is inputted to the IFFT unit 106, which performs the IFFT operation for 2048 points, that is, performs the inverse fast Fourier transform on the inputted data thereby making a conversion between time and frequency domains.

The parallel-serial converter 107 converts the parallel data supplied from the IFFT unit 106 into serial data thereby obtaining time series data including 2048 points. The resultant serial data is outputted to the time slot generator 108.

In the present embodiment, the system clock is set to have a frequency of 8.192 MHz. Therefore, the length (effective symbol period) of time series data including 2048 points becomes (1/8.192 (106) (2048=250 (10-6 sec.

The time slot generator 108 generates a time slot, for example, as shown in FIG. 8, by connecting data including 120 points (14.648 (s), which are the same as 120 points at the head end of the time series data including 2048 points in the effective symbol period, to the tail end and further connecting data including 120 points that are the same as 120 points at the tail end to the head end. The generated time slot is outputted to the transmission windowing unit 109.

Alternatively, as shown in FIG. 7, the time slot generator 108 generates a time slot by connecting data including 240 points (29.297 (s) that are the same as 240 points at the head end of the effective symbol period including 2048 points to the tail end of the effective symbol period and outputs the generated time slot to the transmission windowing unit 109.

Figure 12:
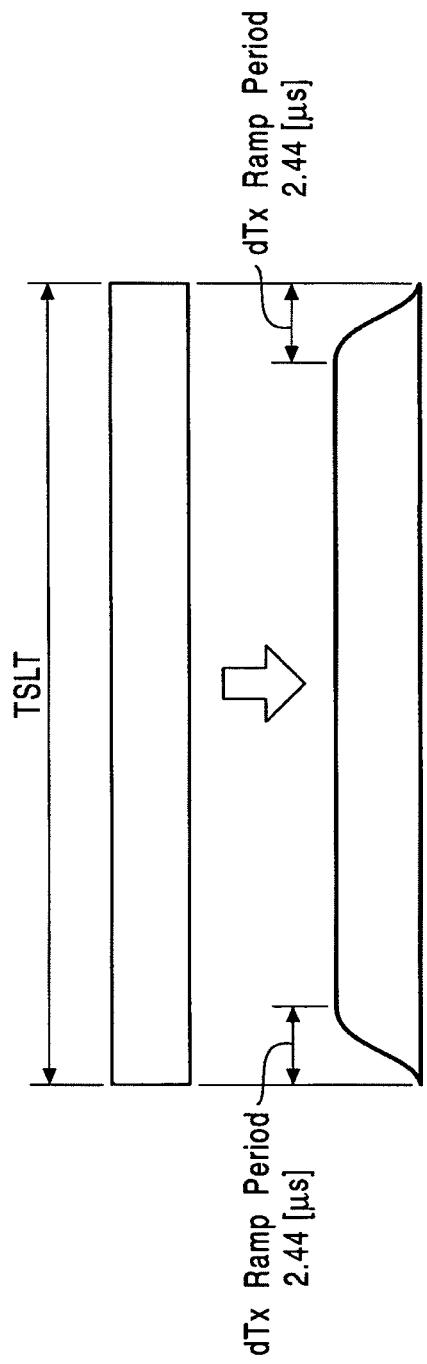
FIG. 12 is a diagram illustrating a process performed by a transmission windowing unit according to the present invention.

The transmission windowing unit 109 performs windowing on the time slot generated by the time slot generator 108, for example, as shown in FIG. 12, such that a ramp period dTx is added to the head end and also to the tail end of the time slot period TSLT. The resultant time slot is outputted to the frame generator 110.

In the present embodiment, the ramp periods dTx put at the head ant tail ends each has a length of 2.44 (s, and thus the total length is equal to 4.88 (s. The purpose of these ramp periods dTx is to prevent undesirable leakage of spectrum to the outside of the assigned frequency band.

Figure 13:
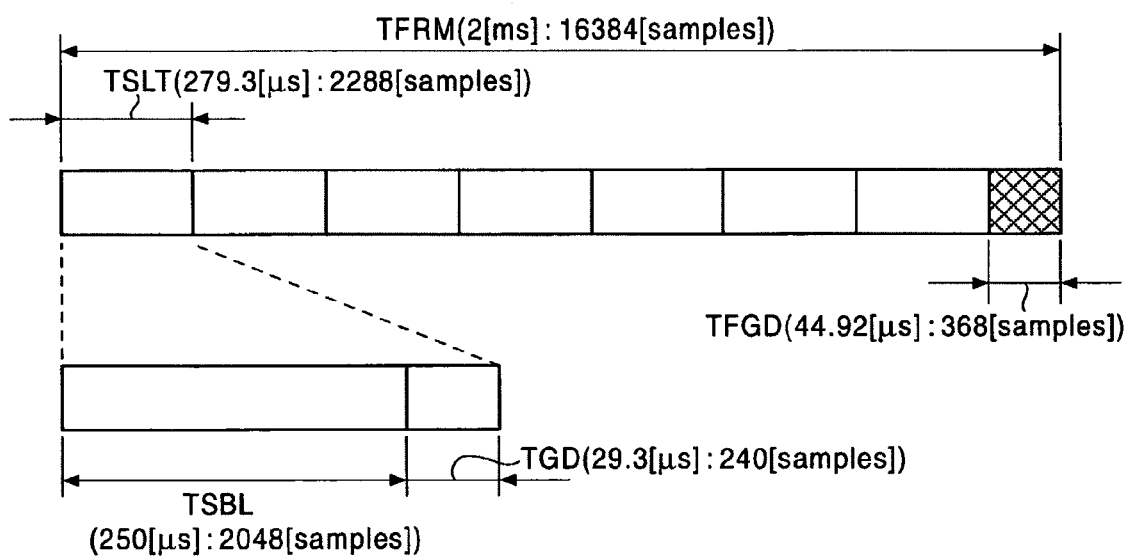
FIG. 13 is a schematic diagram illustrating a process performed by a frame generator according to the present invention.

The frame generator 110 generates one frame FRM, for example, as shown in FIG. 13, by combining seven time slots and putting, thereafter, a 0-power non-signal period (frame guard period) with a length corresponding to 368 points (44.92 (s). The generated frame FRM is outputted to the digital-analog (D/A) converter 113.

As shown in FIG. 13, the length of one time slot period TSLT is equal to 2288 points (279.3 (s), and thus the length of one frame period TFRM including seven time slots and one frame guard period TFGD becomes equal to 16384 points (2 ms).

The GPS receiver 111 receives a GPS signal via a receiving antenna 111a and outputs the received GPS signal to the timing generator 112.

On the basis of the GPS signal supplied from the GPS receiver 111 and the inter-base-station control signal CTL, the timing generator 112 generates a timing signal for controlling the transmission timing of the frame generator 110. The generated timing signal S112 is outputted to the frame generator 110.

In the present embodiment, as described earlier, all base stations transmit frames so that the transmission timings become coincident with each other. To this end, each base station transmits frames in synchronization with the inter-base-station control signal CTL.

This synchronization signal is transmitted via the cable communication network. However, in the case where only this synchronization signal is used, precise synchronization among base stations cannot be achieved, because the synchronization signal encounters a propagation delay when it is transmitted over the cable network. To achieve precise synchronization, each base station also receives the GPS signal and controls the frame transmission timing in accordance with the GPS signal and the inter-base-station control signal CTL.

The D/A converter 113 converts the digital frame data generated by the frame generator 110 into an analog data and outputs the resultant analog data to the quadrature modulator 114.

The quadrature modulator 114 performs quadrature modulation, in accordance with a predetermined scheme, on the frame data that is to be transmitted and that has been converted by the D/A converter 114 into analog form. The resultant data is outputted to the frequency converter 115.

The frequency converter 115 converts the quadrature-modulated data supplied from the quadrature modulator 114 so as to have a frequency in a predetermined frequency band. The resultant signal is transmitted as a RF (Radio Frequency) signal.

Figure 14:
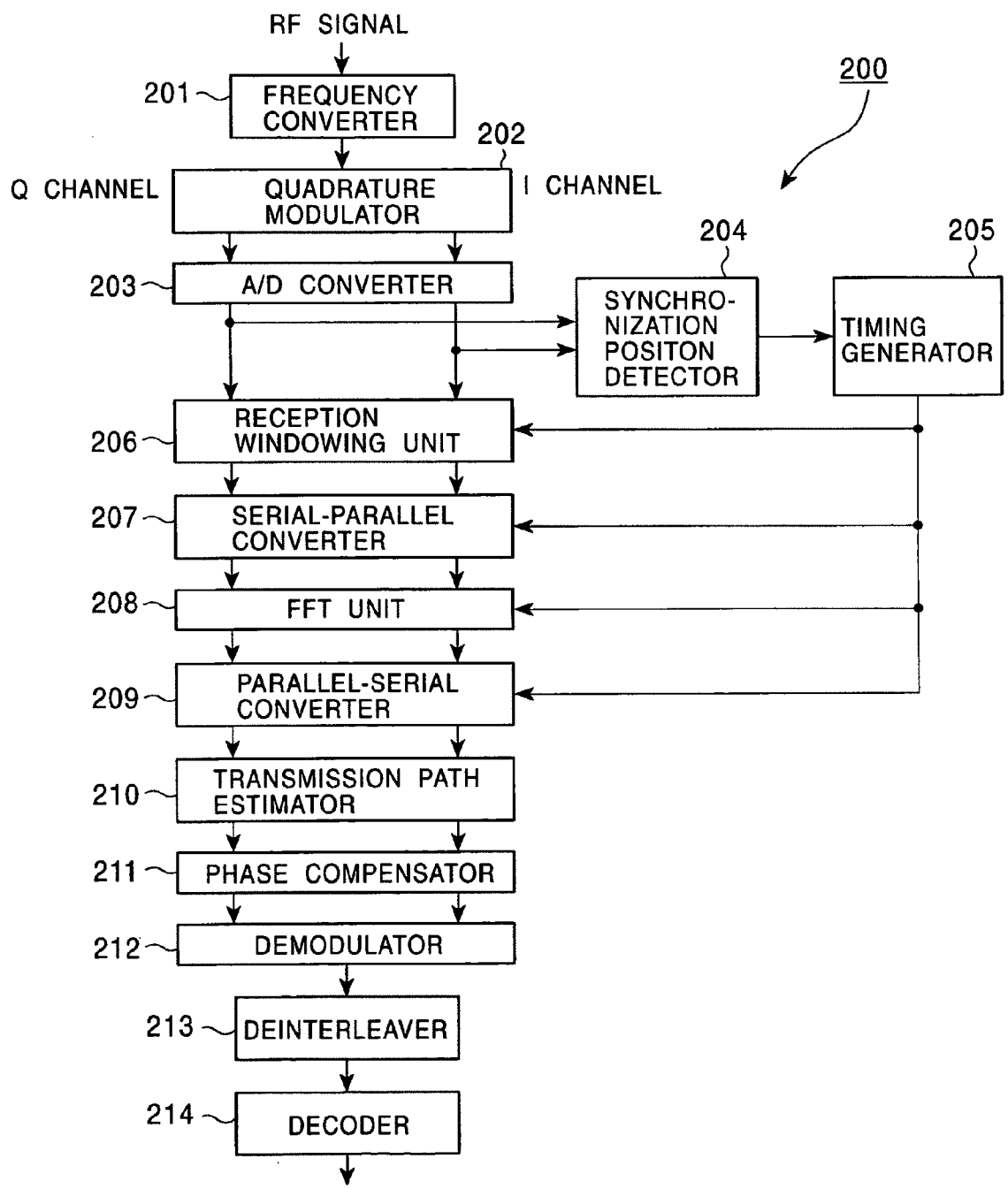
FIG. 14 is a block diagram illustrating a receiving apparatus used in a mobile station, according to an embodiment of the present invention.

FIG. 14 is a block diagram illustrating a receiving apparatus used in a mobile station, according to an embodiment of the present invention.

As shown in FIG. 14, the receiving apparatus 200 according to the present embodiment includes a frequency converter 201, a quadrature demodulator 202, an analog-digital (A/D) converter 203, a synchronization position detector 204, a timing generator 205, a reception windowing unit 206, a serial-parallel converter 207, a FFT unit 208, a parallel-serial converter 209, a transmission path estimator 210, a phase compensator 211, a demodulator 212, a deinterleaver 213, and a decoder 214.

In this receiving apparatus 200, a front-end reception processing unit is formed of the frequency converter 201, the quadrature demodulator 202, and the A/D converter 203, and a back-end reception processing unit is formed of the serial-parallel converter 207, the FFT unit 208, the parallel-serial converter 209, the transmission path estimator 210, the phase compensator 211, the demodulator 212, the deinterleaver 213, and the decoder 214.

The frequency converter 210 extracts only components within a necessary frequency band from an OFDM signal received via an antenna (not shown), that is, the frequency converter 210 removes noise components outside the necessary frequency bands, and then converts the resultant RF signal into an IF (Intermediate Frequency) signal. The resultant IF signal S201 is outputted to the quadrature demodulator 202.

The quadrature demodulator 202 separates an in-phase signal I and a quadrature signal Q from the IF signal supplied from the frequency converter 201 and outputs them to the A/D converter 203.

The A/D converter 203 converts the in-phase signal I and the quadrature signal Q supplied from the quadrature demodulator 202 from analog form into digital form. The resultant digital signals are outputted to the synchronization position detector 204 and the reception windowing unit 206.

In the above process, the sampling rate employed by the A/D converter 203 is set to be equal to 8.192 MHz so that the sampling rate becomes equal to that employed by the transmitting apparatus 100 in the base station.

The synchronization position detector 204 detects the FFT operation timing of the FFT unit 208, from the I- and Q-signals converted into digital form. That is, the synchronization position detector 204 detects the start position of an effective symbol period TSBL, in other words, the position of the first point in the digital signal in the effective symbol period TSBL. The synchronization position detector 204 outputs the resultant synchronization information to the timing generator 205.

On the basis of the synchronization information supplied from the synchronization position detector 204, the timing generator 205 controls the start of the reception windowing operation performed by the reception windowing unit 206, the serial-parallel conversion position performed by the serial-parallel converter 207, the timing of the FFT operation performed by the FFT unit 208, and the timing of the parallel-serial conversion performed by the parallel-serial converter 209.

On the basis of the digital signal supplied from the A/D converter 203 and the windowing start position information supplied from the timing generator 205, the reception windowing unit 206 extracts 2048 points of digital data (250 (s)) starting from the synchronization point and outputs the extracted data to the serial-parallel converter 207.

Compared with the transmission window (279.3 (s)) provided by the transmission windowing unit 109 of the base station transmitting apparatus 100, the reception window (250 (s)) provided by the reception windowing unit 206 is small in length.

The serial-parallel converter 207 converts the 2048 points of digital data supplied from the reception windowing unit 206 from serial form into parallel form and outputs the resultant parallel data to the FFT unit 208.

In accordance with the FFT timing information supplied from the timing generator 205, the FFT unit 208 performs a fast Fourier transform on the 2048 points of digital data thereby making a conversion between the frequency domain and the time domain. The resultant data is then supplied to the parallel-serial converter 209.

Thus, via the fast Fourier transform, the signal in the form of a time series signal including 2048 points and having a spectrum of 100 (n (1 (n (16) subcarriers located in intervals of 4 KHz is converted into a digital signal including 100 (n (1 (n (16) points.

In practice, a digital signal including 2048 points is obtained as a result of fast Fourier transform for 2048 points. However, the available system frequency bandwidth is limited to 6.4 MHz. Therefore, of 2048 subcarriers, up to 1600 subcarriers are used by the transmitting apparatus disposed in a base station, and the remaining 448 subcarriers are set to "0" in power. Thus, the digital signal, which is actually outputted, includes up to 1600 subcarriers, and the remaining subcarriers have a value of "0".

The parallel-serial converter 209 converts the parallel signal supplied from the FFT unit 208 into a serial signal and extracts only necessary points from the 2048 points. The resultant 2048 points of data are outputted to the transmission path estimator 210.

For example, in the case where a frequency bandwidth of 400 kHz is assigned for communication between this mobile station and the base station, the parallel-serial converter 209 at a receiving end extracts only 100 points corresponding to the bandwidth of 400 kHz.

The signal outputted from the parallel-serial converter 209 is outputted to the transmission path estimator 210. Upon receiving the signal from the parallel-serial converter 209, the transmission path estimator 210 extracts only the pilot signal from the received signal and calculates the phase shift from the I-channel and Q-channel components of the pilot signal. The signal indicating the phase shift is outputted to the phase compensator 211.

More specifically, because the base station transmitting apparatus 100 transmits the pilot signal such that the I-channel component thereof has a level of "1", and the Q-channel component has a level of "0", the pilot signal represented in a complex plane has a magnitude of "1" and a phase angle of "0" with respect to the I axis. Therefore, the I and Q values in the complex plane obtained in receiving apparatus 200 of the mobile station directly indicate the phase shift.

The information about the magnitude of the vector in the complex plane is used to determine the threshold value used in the demodulation of a signal modulated by means of a multilevel modulation such as 16QAM.

The phase compensator 211 corrects the phase of the received signal on the basis of the information about the phase shift detected by the transmission path estimator 210. The resultant phase-compensated signal is outputted to the demodulator 212.

The demodulator 212 demodulates the signal in accordance with the demodulation scheme corresponding to the modulation scheme employed by the transmitting apparatus 100 of the base station. The demodulated signal is outputted to the deinterleaver 213.

In the case where a modulation scheme such as 16QAM in which information is represented by the amplitude (magnitude of the vector represented in the complex plane) is employed, the transmission path estimator 210 provides information about the reference reception power level (magnitude of the vector of the received pilot signal), and demodulation is performed using the reference reception power level provided by the transmission path estimator 210.

The deinterleaver 213 deinterleaves the demodulated signal supplied from the demodulator 212 and outputs the resultant signal to the decoder 214.

If the decoder 214 receives the signal that has been demodulated and deinterleaved, the decoder 214 performs, for example, Viterbi decoding on the received signal. Thus, a decoded signal is finally obtained.

The operations of the transmitting apparatus and receiving apparatus used in the OFDM communication system constructed in the above-described manner are described below.

When the transmitting apparatus 100 of a base station receives digital data via, for example, the high-speed downlink network, the coder 101 performs convolution coding with a constraint length of K=9 on the received digital data.

The coded digital data outputted from the coder 101 is interleaved by the interleaver 102 and inputted to the symbol mapper 103.

The symbol mapper 103 determines the symbol mapping scheme (scheme of the first modulation) in accordance with the strength of the electric field, monitored by the mobile station, of the signal transmitted from the base station of the high-speed downlink system, and the symbol mapper 103 performs symbol mapping by the determined symbol mapping scheme. The resultant symbol-mapped data including an I-channel signal and a Q-channel signal is outputted to the pilot signal inserter 104.

The pilot signal inserter 104 inserts a pilot signal of "1" into the I-channel signal supplied from the symbol mapper 103 and a pilot signal of "0" into the Q-channel signal and outputs the resultant signals to the serial-parallel converter 105.

The serial-parallel converter 105 divides the input symbol data into segments, for example, every 98 symbols, and adds one symbol to head and tail ends of each segment so that each segment includes 100 symbols. Furthermore, the serial-parallel converter 105 puts 1948 symbols of "0" before and after each segment including 100 symbols so that each segment includes a total of 2048 symbols and so that the resultant symbol data has a frequency spectrum in a radio channel band assigned to a base station. The resultant parallel symbol data is outputted to the IFFT unit 106.

The IFFT unit 106 performs an inverse fast Fourier transform on the parallel 2048 symbol data outputted from the serial-parallel converter 105 thereby making a conversion between time and frequency domains. The resultant data is outputted to the parallel-serial converter 107.

The parallel-serial converter 107 converts the parallel data outputted from the IFFT unit 106 into serial data thereby generating time series data including 2048 points. The resultant serial data is outputted to the time slot generator 108.

The time slot generator 108 generates a time slot, for example, by connecting data including 120 points (14.648 (s)), which are the same as 120 points at the head end of the time series data including 2048 points in the effective symbol period, to the tail end and further connecting data including 120 points that are the same as 120 points at the tail end to the head end. The generated time slot is outputted to the transmission windowing unit 109.

The transmission windowing unit 109 performs windowing on the time slot generated by the time slot generator 108, for example, such that a ramp period dTx is added to the head end and also to the tail end of the time slot period TSLT to prevent undesirable leakage of spectrum to the outside of the assigned frequency band. The resultant time slot is outputted to the frame generator 110.

The frame generator 110 generates one frame FRM, for example, by combining seven time slots and putting, thereafter, a 0-power non-signal period (frame guard period) with a length corresponding to 368 points (44.92 (s). The generated frame FRM is outputted to the digital-analog (D/A) converter 113.

Each base station transmits frames in synchronization with the inter-base-station control signal CTL.

This synchronization signal is transmitted via the cable communication network. However, in the case where only this synchronization signal is used, precise synchronization among base stations cannot be achieved, because the synchronization signal encounters a propagation delay when it is transmitted over the cable network. Thus, in each base station, to achieve precise synchronization, the GPS receiver 111 receives the GPS signal, and, on the basis of the GPS signal and the inter-base-station control signal CTL, the timing generator 112 generates a timing signal for controlling the timing of frame transmission performed by the frame generator 110 and outputs the resultant timing signal S112 to the frame generator 110.

The frame generator 110 generates a frame at a time specified by the timing signal S112 and outputs the generated frame to the D/A converter 113.

The D/A converter 113 the digital frame data generated by the frame generator 110 into analog data. The resultant analog data is then transmitted after being quadrature-modulated by the quadrature modulator 114 in accordance with a predetermined modulation scheme and converted by the frequency converter 115 into a frequency in a predetermined frequency band.

The OFDM signal transmitted by the transmitting apparatus 100 of the base station is received by the receiving apparatus 200 of a mobile station.

The signal received by the receiving apparatus 200 is passed through a bandpass filter (not shown) to extract only components in a necessary frequency band and is converted into an IF signal by the frequency converter 201. Thereafter, the IF signal is separated by the quadrature demodulator into an I-signal and a Q-signal. The resultant I-signal and Q-signal are converted into digital form by the A/D converter 203.

After analog-digital conversion, both the I-signal and the Q-signal are supplied to the synchronization position detector 204 and the reception windowing unit 206.

The synchronization position detector 204 detects the timing of the FFT operation to be performed by the FFT unit 208. That is, the synchronization position detector 204 detects the start position of an effective symbol period TSBL, in other words, the position of the first point in the digital signal in the effective symbol period. The synchronization position detector 204 outputs the resultant synchronization information to the timing generator 205.

On the basis of the synchronization information supplied from the synchronization position detector 204, the timing generator 205 controls the start of the reception windowing operation performed by the reception windowing unit 206, the serial-parallel conversion position performed by the serial-parallel converter 207, the timing of the FFT operation performed by the FFT unit 208, and the timing of the parallel-serial conversion performed by the parallel-serial converter 209.

On the basis of the digital signal supplied from the A/D converter 203 and the windowing start position information supplied from the timing generator 205, the reception windowing unit 206 extracts 2048 points of digital data (250 (s)) starting from the synchronization point and outputs the extracted data to the serial-parallel converter 207.

The serial-parallel converter 207 converts the 2048 points of digital data supplied from the reception windowing unit 206 from serial form into parallel form and outputs the resultant parallel data to the FFT unit 208.

In accordance with the FFT timing information supplied from the timing generator 205, the FFT unit 208 performs a fast Fourier transform on the 2048 points of digital data thereby making a conversion between the frequency domain and the time domain. The resultant data is then supplied to the parallel-serial converter 209.

The parallel-serial converter 209 converts the parallel signal supplied from the FFT unit 208 into a serial signal. Via this, process, particular points are extracted from 2048 points.

The transmission path estimator 209 extracts only the pilot signal from the received signal and calculates the phase shift from the I-channel and Q-channel components of the pilot signal. The signal indicating the phase shift is outputted to the phase compensator 211.

The phase compensator 211 corrects the phase of the received signal on the basis of the phase shift information and supplies the corrected signal to the demodulator 212.

The demodulator 212 demodulates the signal in accordance with the demodulation scheme corresponding to the modulation scheme employed by the transmitting apparatus of the base station. In the case where a modulation scheme such as 16QAM in which information is represented by the amplitude (magnitude of a vector represented in the complex plane) is employed, the transmission path estimator 210 provides information about the reference reception power level (magnitude of the vector of the received pilot signal), and demodulation is performed using the reference reception power level provided by the transmission path estimator 210.

The deinterleaver 213 deinterleaves the demodulated signal supplied from the demodulator 212 and outputs the resultant signal to the decoder 214. The decoder 214 performs Viterbi decoding on the received signal.

Figure 15:
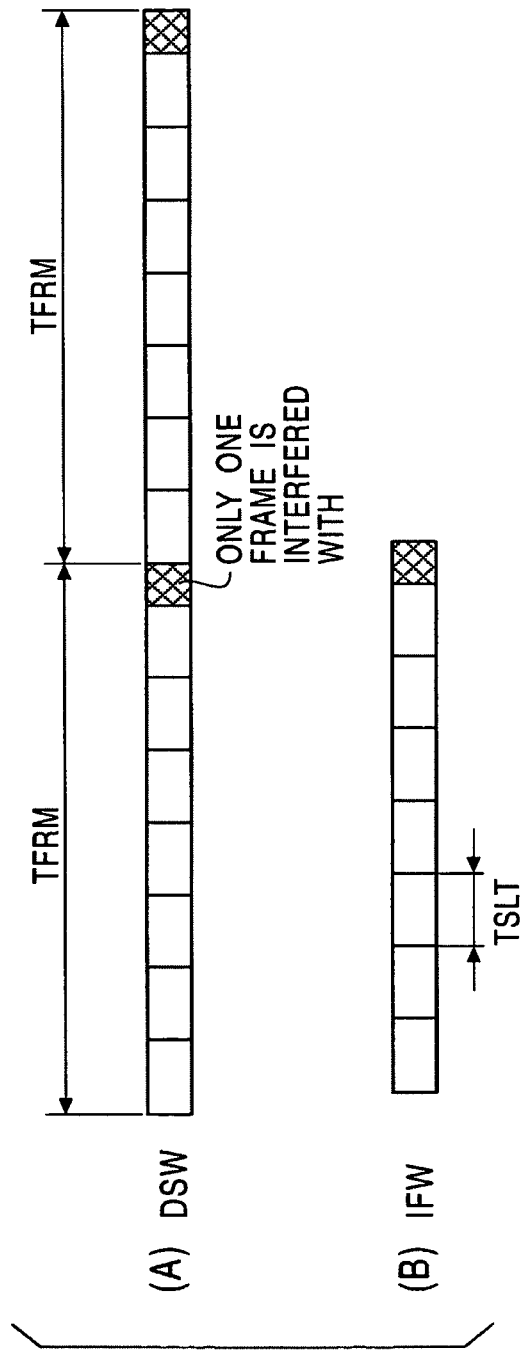
FIG. 15 is a diagram illustrating an advantage obtained by using a frame guard.
Figure 16:
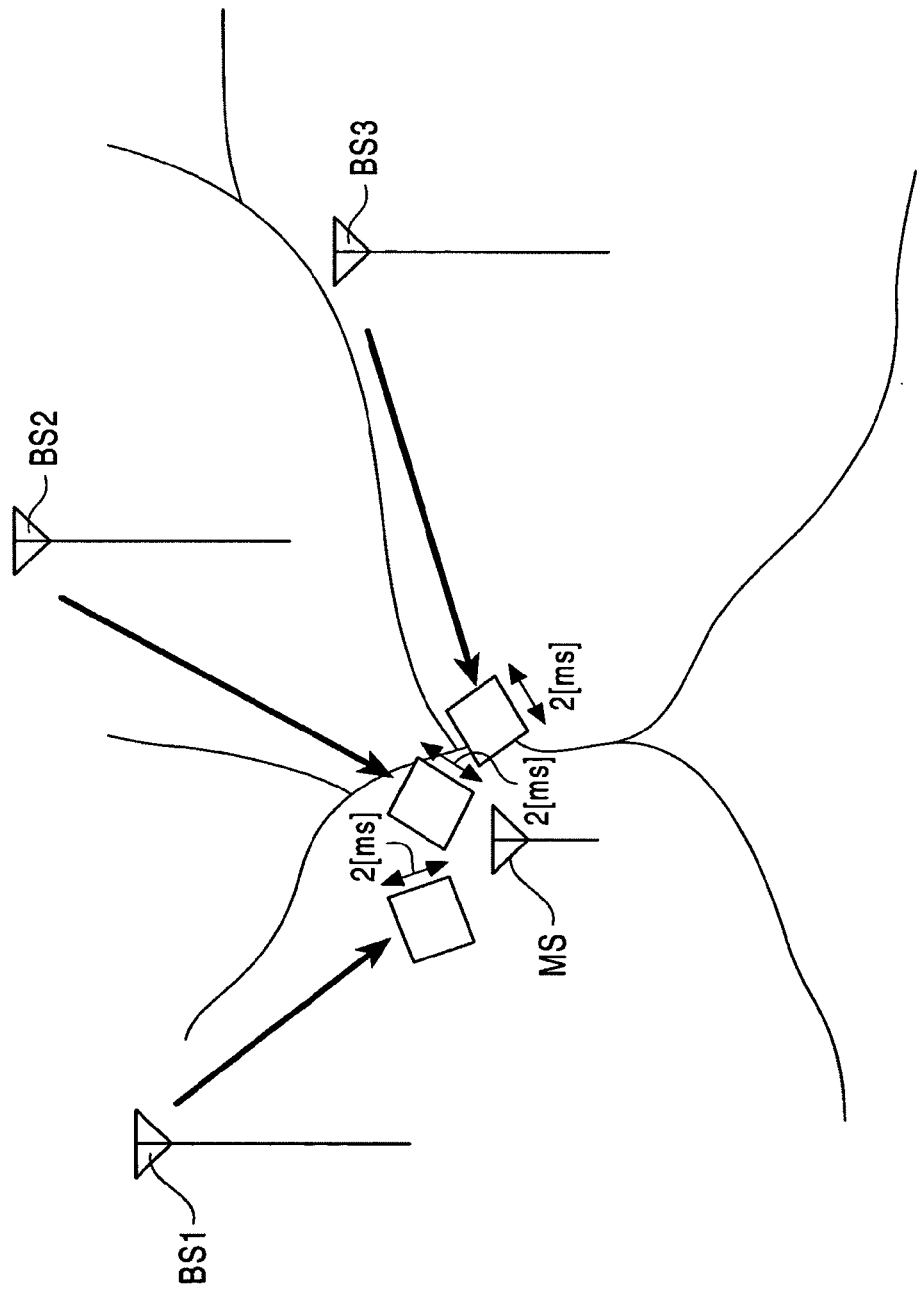
FIG. 16 is a diagram illustrating a mobile communication system.
Figure 17:
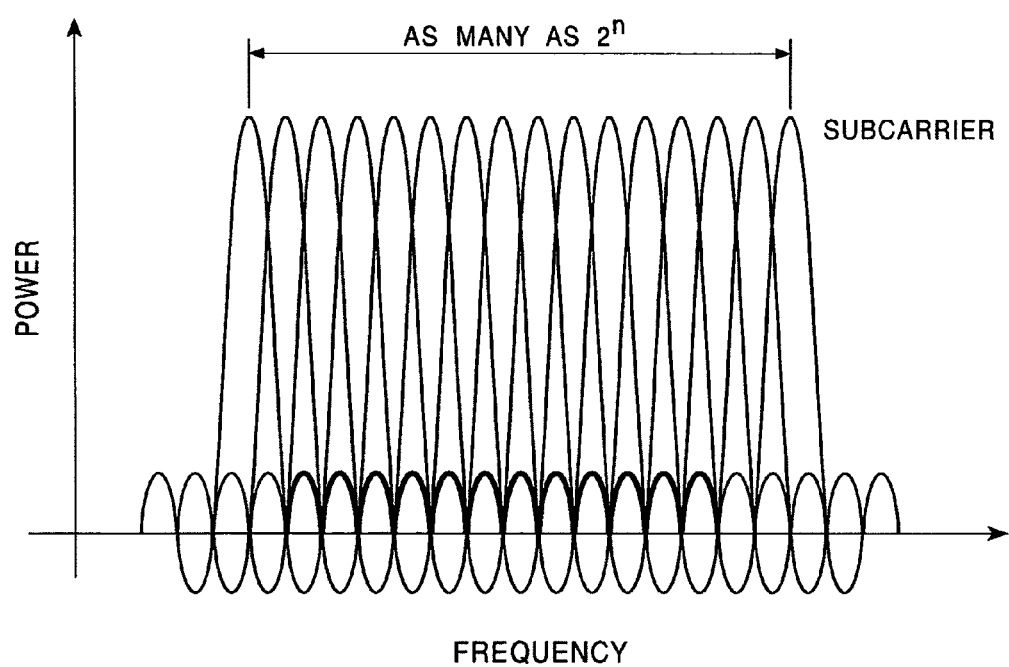
FIG. 17 is a diagram illustrating an OFDM modulation scheme.
Figure 18:
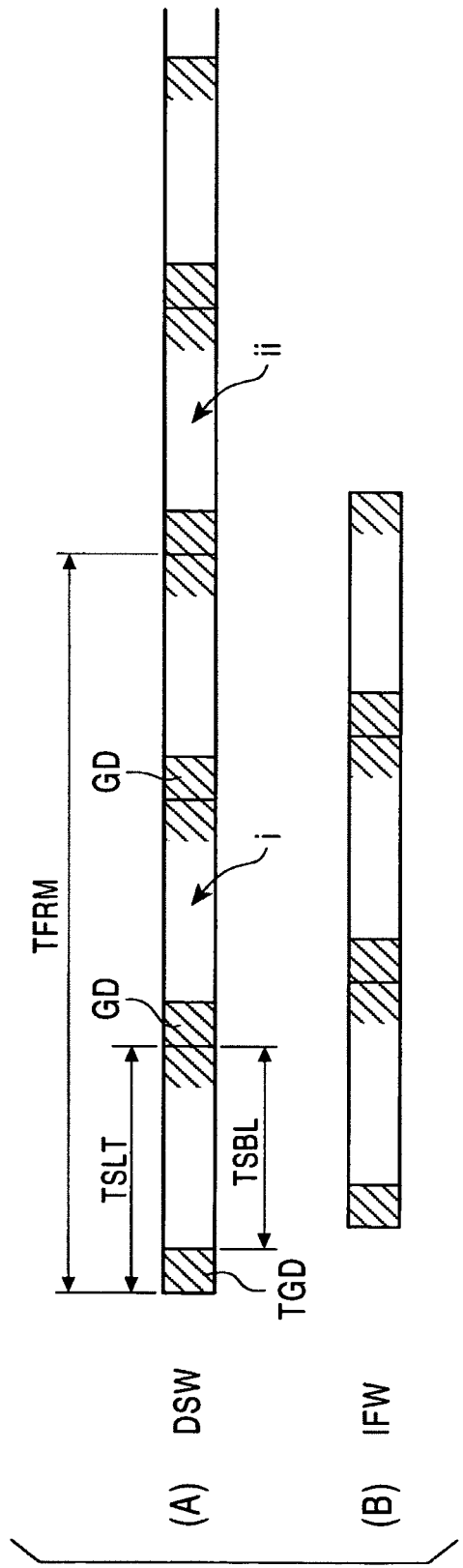
FIG. 18 is a diagram illustrating an example of a conventional format of an OFDM signal used in an OFDM transmission system.
Figure 19:
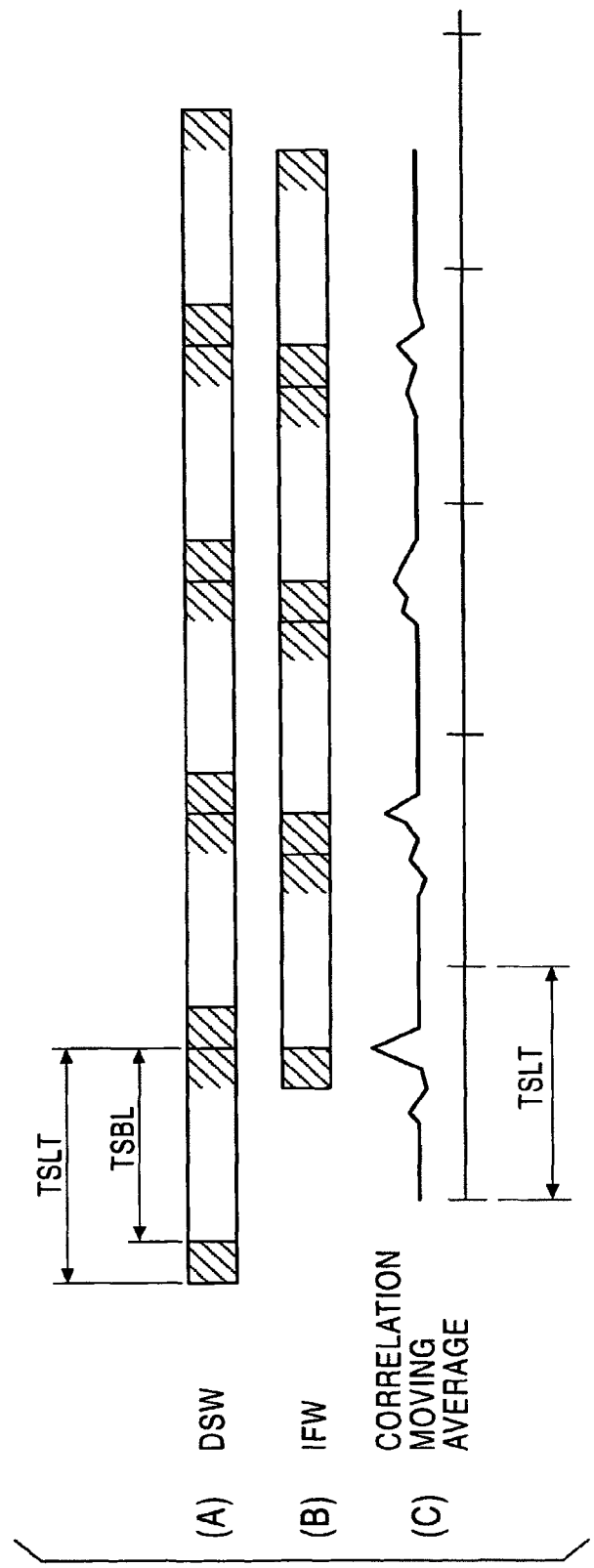
FIG. 19 is a diagram illustrating a signal processing performed by a receiving system in a conventional mobile station.
Figure 20:
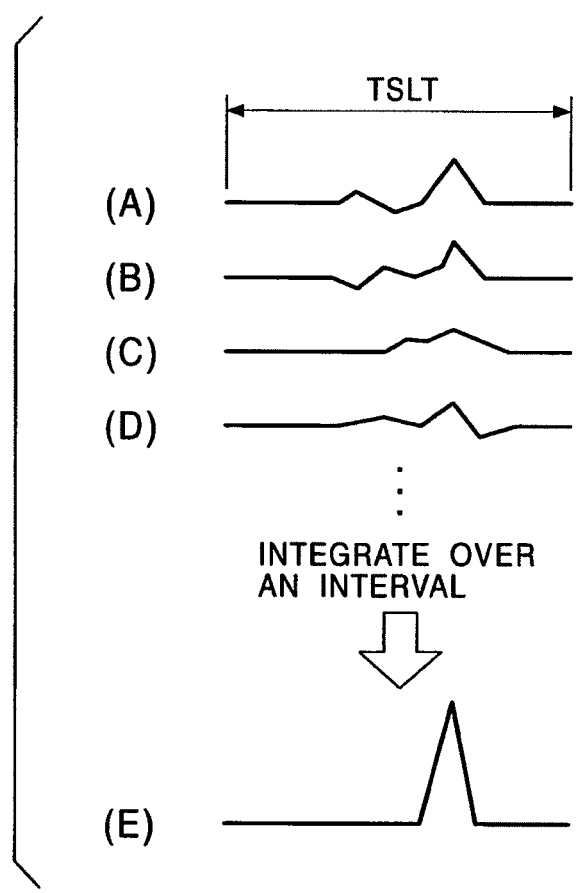
FIG. 20 is a diagram illustrating an interval integration performed by a conventional OFDM demodulator.

The contribution of an interfering wave in the present communication system is discussed below with reference to FIG. 15. Herein, we assume that one frame of interfering wave has arrived due to a fluctuation in the electric field strength of the reception signal caused by fading or multipath transmission.

In this situation, a plurality of frames are being transmitted successively as a desired wave DSW. Because all base stations transmit frames with the precisely synchronized timing, the interfering wave IFW transmitted from a distant base station arrives slightly later than the desired wave DSW using the same channel transmitted from a base station at a closer location.

In the convention technique in which no frame guard is used, the interfering wave IFW interferes with two frames of the desired wave DSW. In contrast, in the communication system according to the present embodiment of the invention, a frame guard included in an OFDM signal prevents the interfering wave IFW from interfering with the second frame, as shown in FIGS. 15(A) and 15(B).

In the present embodiment, as described above, to transmit the frame including the additional frame guard with the precisely synchronized timing from each base station, the base-station transmitting apparatus 100 is constructed so as to include the inter-base-station control signal interface for achieving synchronization among base stations, the receiving antenna 111a for receiving the GPS signal, the GPS receiver 111 for receiving the GPS signal, the timing generator 112 for controlling the respective function blocks in accordance with the GPS signal and the inter-base-station control signal CTL so as to precisely synchronize the timing of frame transmission among the base stations, the front-end transmission processing unit including the blocks 101 to 109 for converting transmission information into transmission time slots, the frame generator 110 for generating a frame including a plurality of time slots and one frame guard, and the back-end transmission processing unit including the blocks 113 to 115 for transmitting the generated frame as a radio signal, and, to demodulate a received signal including a frame guard period thereby reproducing transmission information, the receiving apparatus 200 is constructed so as to include the front-end reception processing unit including blocks 201 to 203 for receiving a radio signal and converting the received radio signal into a digital signal; the synchronization position detector 204 for detecting the start position of an effective symbol period from the received signal; the timing generator 205 for controlling the operation timings of respective functional blocks on the basis of the synchronization position information; the reception windowing unit 206 for extracting only the effective symbol period including no time guard period and no frame guard period under the control of the timing generator; and the back-end reception processing unit including blocks 207 to 214 for reproducing desired information from the windowed signal, thereby ensuring that a frame loss due to interference caused by use of the same channel can be suppressed even in a system in which the number of repetition cells is set to be small, that is, the distance between cells where the same channel is used is set to be small to achieve high-efficiency use of radio channels.

Thus, it is possible to reduce the number of repetition cells without causing an increase in a transmission error, thereby achieving efficient use of frequency resources.

Furthermore, it is possible to achieve an improvement in synchronization in the OFDM radio communication system using a frame guard.

Using the synchronization apparatus, it is possible to determine a point at which a frame guard should be inserted. This makes it unnecessary to transmit frame synchronization control information (indicating the start position of a frame), and thus it becomes possible to transmit an increased amount of information.

As described above, the present invention provides great advantages. That is, a frame loss due to interference caused by use of the same channel can be suppressed even in a system in which the number of repetition cells is set to be small, that is, the distance between cells where the same channel is used is set to be small to achieve high-efficiency use of radio channels.

Thus, it is possible to reduce the number of repetition cells without causing an increase in a transmission error, thereby achieving efficient use of frequency resources.

Furthermore, the present invention makes it possible to achieve synchronization in a radio communication system using a frame guard.

Furthermore, because it is possible to determine a point at which a frame guard should be inserted, it is unnecessary to transmit frame synchronization control information (indicating the start position of a frame), and thus it becomes possible to transmit an increased amount of information.

What is claimed is:

1. A transmission method performed in an orthogonal frequency division multiplexing wireless communication system, the method comprising:
converting a transmission signal into a transmission time slot;
generating a frame that includes a series of n (greater than 1) time slots and a frame guard period added to the series of n time slots, the frame guard period being a non-signal period, and each time slot including an effective symbol period and guard period added to the effective symbol period, where the length of the series of n time slots is less than the length of the frame, wherein the frame guard period is separate from the guard period; and
transmitting the generated frame as a radio signal using a transmission apparatus, wherein the radio signal is an OFDM signal having the frame guard period.

2. A transmission method according to claim 1, further comprising:
modulating transmission information to produce the OFDM signal using a modulation scheme selected on the basis of electric field strength information received from a communication terminal to which the transmission information is transmitted.

3. A transmission method according to claim 1, further comprising:
generating a time slot by adding a predetermined guard period to an effective symbol period.

4. The transmission method of claim 1, wherein the frame guard period is at the beginning and/or the end of the frame.

5. A transmission system comprising:
a front-end transmission processing unit for converting a transmission signal into a transmission time slot;
a frame generator for generating a frame that includes a series of n (greater than 1) time slots and a frame guard period added to the series of n time slots, the frame guard period being a non-signal period, and each time slot including an effective symbol period and guard period added to the effective symbol period, where the length of the series of n time slots is less than the length of the frame, wherein the frame guard period is separate from the guard period; and
a back-end transmission processing unit for transmitting the generated frame as a radio signal, wherein the radio signal is an OFDM signal having the frame guard period.

6. A transmission system according to claim 5, wherein the front-end transmission processing unit includes a modulator for modulating transmission information to produce the OFDM signal using a modulation scheme selected on the basis of electric field strength information received from a communication terminal to which the transmission information is transmitted.

7. A transmission system according to claim 5, wherein the front-end transmission processing unit generates a time slot by adding a predetermined guard period to an effective symbol period.

8. The transmission system of claim 5, wherein the frame guard period is at the beginning and/or the end of the frame.

9. A computer program, embodied in a non-transitory computer-readable medium, when executed on one or more processors, causing the one or more processors to perform steps comprising:

converting a transmission signal into a transmission time slot;

generating a frame that includes a series of n (greater than 1) time slots and a frame guard period added to the series of n time slots, the frame guard period being a non-signal period, and each time slot including an effective symbol period and guard period added to the effective symbol period, where the length of the series of n time slots is less than the length of the frame, wherein the frame guard period is separate from the guard period; and transmitting the generated frame as a radio signal, wherein the radio signal is an OFDM signal having the frame guard period.

10. A computer program according to claim 9, further causing the one or more processors to perform the step of:

modulating transmission information to produce the OFDM signal using a modulation scheme selected on the basis of electric field strength information received from a communication terminal to which the transmission information is transmitted.

11. A computer program according to claim 9, further causing the one or more processors to perform the step of:

generating a time slot by adding a predetermined guard period to an effective symbol period.

12. The computer program of claim 9, wherein the frame guard period is at the beginning and/or the end of the frame.

* * * * *